United States Patent
Nandanwar et al.

(10) Patent No.: US 12,380,026 B2
(45) Date of Patent: Aug. 5, 2025

(54) OPTIMIZING CACHE ENERGY CONSUMPTION IN PROCESSOR-BASED DEVICES

(71) Applicant: QUALCOMM Incorporated, San Diego, CA (US)

(72) Inventors: Darshan Kumar Nandanwar, Bangalore (IN); Kartik Gunvantbhai Desai, Savarkundla (IN)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 18/325,419

(22) Filed: May 30, 2023

(65) Prior Publication Data

US 2024/0403216 A1 Dec. 5, 2024

(51) Int. Cl.
*G06F 12/0804* (2016.01)
*G06F 12/1009* (2016.01)

(52) U.S. Cl.
CPC ...... *G06F 12/0804* (2013.01); *G06F 12/1009* (2013.01); *G06F 2212/1028* (2013.01); *G06F 2212/6032* (2013.04); *G06F 2212/6082* (2013.01)

(58) Field of Classification Search
CPC ............ G06F 12/0804; G06F 12/1009; G06F 2212/1028; G06F 2212/6032
See application file for complete search history.

(56) References Cited

U.S. PATENT DOCUMENTS

| 10,157,137 B1* | 12/2018 | Jain ..................... G06F 12/0864 |
| 2008/0082721 A1* | 4/2008 | Yu ....................... G06F 12/0864 |
| | | 711/3 |
| 2009/0031082 A1* | 1/2009 | Ford ................... G06F 12/0864 |
| | | 711/216 |

(Continued)

FOREIGN PATENT DOCUMENTS

WO WO-2005024635 A2 * 3/2005 ......... G06F 12/0864

OTHER PUBLICATIONS

"What is Pipelining in CPUs?" Reddit. Published in 2018. <https://www.reddit.com/r/compsci/comments/9jvssy/what_is_pipelining_in_cpus/>. (Year: 2018).*

(Continued)

*Primary Examiner* — Kenneth M Lo
*Assistant Examiner* — Hewy H Li
(74) *Attorney, Agent, or Firm* — W&T/Qualcomm

(57) ABSTRACT

Optimizing cache energy consumption in processor-based devices is disclosed herein. In some aspects, a processor-based device comprises a way lookup table (WLUT) circuit that is configured to receive an effective address (EA) for a memory access request. The WLUT circuit determines that a tag portion of the EA corresponds to a tag of a WLUT entry among a plurality of WLUT entries. In response, the WLUT circuit transmits a predicted way indicator of the WLUT entry to a cache controller. The cache controller accesses, in a set among a plurality of sets of a cache memory device corresponding to a set portion of the EA, only a predicted tag way among a plurality of tag ways of the cache memory (Continued)

device indicated by the predicted way indicator and only a predicted data way among a plurality of data ways of the cache memory device indicated by the predicted way indicator.

29 Claims, 12 Drawing Sheets

(56) References Cited

U.S. PATENT DOCUMENTS

| | | | |
|---|---|---|---|
| 2010/0049953 A1* | 2/2010 | Mylavarapu | G06F 12/0882 712/225 |
| 2014/0115264 A1* | 4/2014 | Shirahige | G06F 1/3275 711/137 |
| 2016/0011877 A1* | 1/2016 | Mukherjee | G06F 9/3838 712/208 |
| 2020/0401524 A1* | 12/2020 | Sundaram | G06F 9/3824 |

OTHER PUBLICATIONS

"Can anyone explain to me what an effective address is?" Reddit. Published 2014. <https://www.reddit.com/r/learnprogramming/comments/2y1v7l/assembly_can_anyone_explain_to_me_what_an/#:~:text=Sometimes%20the%20effective%20address%20is,is%20simply%20an%20immediate%20value.>. Retrieved Jul. 2024. (Year: 2014).*

Inoue, Koji, Tohru Ishihara, and Kazuaki Murakami. "A high-performance and low-power cache architecture with speculative way-selection." IEICE transactions on electronics 83.2 (2000): 186-194. (Year: 2000).*

Powell, M. et al., "Reducing Set-Associative Cache Energy via Way-Prediction and Selective Direct-Mapping," Proceedings of the 34th International Symposium on Microarchitecture (MICRO-34), Dec. 1-5, 2001, Austin, TX, USA, IEEE, 12 pages.

* cited by examiner

OPTIMIZING CACHE ENERGY CONSUMPTION IN PROCESSOR-BASED DEVICES

BACKGROUND

I. Field of the Disclosure

The technology of the disclosure relates generally to cache memory devices in processor-based devices, and, in particular, to optimizing energy consumption of cache memory devices.

II. Background

Conventional processor-based devices are subject to a phenomenon known as memory access latency, which is a time interval between the time a processor of a processor-based device initiates a memory access request for data (i.e., by executing a memory load instruction) and the time the processor actually receives the requested data. If the memory access latency for a memory access request is large enough, the processor may be forced to stall further execution of instructions while waiting for a memory access request to be fulfilled. One approach to minimizing the effects of memory access latency is the use of cache memory devices (also referred to simply as "cache"). A cache is a memory device that has a smaller capacity than system memory, but that can be accessed faster by a processor due to the type of memory used and/or the physical location of the cache relative to the processor. The cache can be used to store copies of data retrieved from frequently accessed memory locations in the system memory (or from a higher-level cache such as a Last Level Cache (LLC)), thereby reducing memory access latency.

A set-associative cache is a type of cache memory device in which the cache memory device is subdivided into a number of sets that each contain a number of ways. Each way can store a block of memory, such as a cache line. In a set-associative cache, a copy of data retrieved from a given memory address can be stored in any one of the ways of the set corresponding to the memory address (as opposed to a direct-mapped cache, in which the data copy can only be stored in one specific location in the cache memory device corresponding to the memory address). Set-associative caches thus can reduce the number of cache misses by enabling cached data for a given memory address to be stored in multiple locations within the cache memory device.

To minimize access time, conventional set-associative caches are configured to probe all ways in which data may be stored in parallel, even though only the output of the way in which the requested data is stored is used. Consequently, the energy spent accessing the other ways not storing the requested data is wasted, which may result in significant energy dissipation. In addition, static power associated with set-associative caches (i.e., power that is consumed by the set-associative cache when there is no activity) tends to increase as the memory circuits used to implement set-associative caches become denser. Accordingly, mechanisms for optimizing cache energy consumption are desirable.

SUMMARY OF THE DISCLOSURE

Aspects disclosed in the detailed description include optimizing cache energy consumption in processor-based devices. Related apparatus, methods, and computer-readable media are also disclosed. In this regard, in some exemplary aspects disclosed herein, a processor-based device comprises an instruction processing circuit that provides, within an execution stage circuit, a way lookup table (WLUT) circuit. The WLUT circuit includes a plurality of WLUT entries that are indexed by corresponding tag addresses. Each WLUT entry comprises a predicted way indicator that indicates a way, within a set of a cache memory device, in which a data value for a memory address that corresponds to the tag address associated with the WLUT entry is predicted to be stored. In exemplary operation, the WLUT circuit receives an effective address (EA) for a memory access request, wherein the EA is the address of a memory location to be accessed when performing the memory access request. The WLUT circuit determines whether a tag portion of the EA corresponds to a tag of a WLUT entry, and, if so, transmits the predicted way indicator of the WLUT entry to a cache controller of the cache memory device. The cache controller then accesses, within a set corresponding to a set portion of the EA, only a predicted tag way and a predicted data way indicated by the predicted way indicator. By accessing only the predicted tag way and the predicted data way instead of probing all ways in parallel, energy consumption of the cache memory device may be reduced when the predicted way indicator correctly predicts the way in which the data is stored.

In some aspects, if the cache controller determines that the WLUT circuit generated a correct predicted way indicator (e.g., by determining that the predicted tag way indicated by the predicted way indicator matches the tag portion of the EA), the cache controller performs the memory access request using data stored in the predicted data way of the cache memory device. For example, the cache controller may update data stored in the predicted data way if the memory access request is a memory write request, or may read data stored in the predicted data way and provide the data to a subsequent pipeline stage circuit if the memory access request is a memory read request. Some aspects may provide that, if the WLUT circuit does not correctly predict the predicted data way, the cache controller may instruct an issue stage circuit to replay one or more instructions that are dependent on the memory access request. The cache controller may also compare the other tag ways within the set (other than the predicted tag way) to the tag portion of the EA and, if a match is found, the data stored by the data way corresponding to the matching tag way may be used to perform the memory access request.

According to some aspects, the functionality of the WLUT circuit may be further enhanced through the use of a fast EA generation circuit to generate and provide the EA to the WLUT circuit. The fast EA generation circuit in such aspects comprises an adder circuit that has a size smaller than an architecturally-defined base address (e.g., a 19-bit adder circuit that is smaller than a 48-bit base address as defined by the Reduced Instruction Set Computer (RISC) architecture). The fast EA address generation circuit generates a first EA using the adder circuit operating on one or more lower bits of a base address and an offset, while a conventional address generation circuit generates a second EA in parallel. If no carry results from the generation of the first EA, the first EA is transmitted to the WLUT circuit as the EA. Otherwise, the second EA is transmitted to the WLUT circuit as the EA.

Some aspects that employ the fast EA address generation circuit may further provide an address generation latency (AGL) prediction circuit to predict whether the fast EA address generation circuit or the address generation circuit will be used to generate the EA. The AGL prediction circuit in such aspects comprises a plurality of program-counter (PC)-indexed AGL entries that each indicates whether an EA corresponding to each PC was previously generated correctly by the fast EA address circuit. Upon receiving a PC as input, the AGL prediction circuit determines whether an AGL entry corresponds to the PC. If so, the AGL prediction circuit, based on the AGL entry, generates a prediction of whether the fast EA generation circuit will be used to generate the EA. The AGL prediction circuit then schedules one or more dependent instructions based on the prediction (i.e., based on an expected delay of whichever of the fast EA generation unit and the conventional address generation unit is predicted to generate the EA).

In some aspects, the cache memory device may be configured to reduce static power consumption using a plurality of drowse circuits corresponding to the plurality of data ways. The plurality of drowse circuits are configured to place the cache lines in each corresponding data way in a drowse state (i.e., in a state in which the voltage provided to each cache line is the minimum voltage required to preserve the data value stored in the cache line) or in a wake state (i.e., in a state in which full voltage is provided to the cache line). Some such aspects may provide that the plurality of data ways are placed in a drowse state on powerup of the processor-based device, and are subsequently placed in a wake state when the predicted tag way indicated by the predicted way indicator in the set corresponding to the set portion of the EA matches the tag portion of the EA.

In another aspect, a processor-based device is disclosed. The processor-based device comprises a cache controller that communicatively coupled to a cache memory device. The cache memory device comprises a tag array and a data array and is organized as a plurality of sets each comprising a plurality of tag ways of the tag array and a plurality of data ways of the data array. The processor-based device further comprises an instruction processing circuit that is configured to process an instruction stream in an instruction pipeline that comprises a plurality of pipeline stage circuits. The instruction processing circuit comprises a WLUT circuit providing a plurality of WLUT entries that correspond to a plurality of tags and that store a corresponding plurality of predicted way indicators. The WLUT circuit is configured to receive an EA for a memory access request. The WLUT circuit is further configured to determine whether a tag portion of the EA corresponds to a tag of a WLUT entry among the plurality of WLUT entries. The WLUT circuit is also configured to, responsive to determining that the tag portion of the EA corresponds to the tag of the WLUT entry, transmit a predicted way indicator of the WLUT entry to the cache controller. The cache controller is configured to access, in a set among the plurality of sets corresponding to a set portion of the EA, only a predicted tag way among the plurality of tag ways indicated by the predicted way indicator and only a predicted data way among the plurality of data ways indicated by the predicted way indicator.

In another aspect, a processor-based device is disclosed. The processor-based device comprises means for receiving an EA for a memory access request. The processor-based device further comprises means for determining that a tag portion of the EA corresponds to a tag of a WLUT entry among a plurality of WLUT entries of a WLUT circuit. The processor-based device also comprises means for accessing, in a set among a plurality of sets of a cache memory device corresponding to a set portion of the EA, only a predicted tag way among a plurality of tag ways of the cache memory device indicated by a predicted way indicator of the WLUT entry and only a predicted data way among a plurality of data ways of the cache memory device indicated by the predicted way indicator of the WLUT entry.

In another aspect, a method for optimizing cache energy consumption is disclosed. The method comprises receiving, by a WLUT circuit of an instruction processing circuit of a processor-based device, an EA for a memory access request. The method further comprises determining, by the WLUT circuit, that a tag portion of the EA corresponds to a tag of a WLUT entry among a plurality of WLUT entries of the WLUT circuit. The method also comprises, responsive to determining that the tag portion of the EA corresponds to the tag of the WLUT entry, transmitting, by the WLUT circuit, the predicted way indicator of the WLUT entry to a cache controller of the processor-based device. The method additionally comprises accessing, by the cache controller in a set among a plurality of sets of a cache memory device corresponding to a set portion of the EA, only a predicted tag way among a plurality of tag ways of the cache memory device indicated by the predicted way indicator and only a predicted data way among a plurality of data ways of the cache memory device indicated by the predicted way indicator.

In another aspect, a non-transitory computer-readable medium is disclosed. The non-transitory computer-readable medium stores computer-executable instructions that, when executed, cause a processor of a processor-based device to receive an EA for a memory access request. The computer-executable instructions further cause the processor to determine that a tag portion of the EA corresponds to a tag of a WLUT entry among a plurality of WLUT entries of a WLUT circuit. The computer-executable instructions also cause the processor to access, in a set among a plurality of sets of a cache memory device corresponding to a set portion of the EA, only a predicted tag way among a plurality of tag ways of the cache memory device indicated by a predicted way indicator of the WLUT entry and only a predicted data way among a plurality of data ways of the cache memory device indicated by the predicted way indicator.

DETAILED DESCRIPTION

Figure 1:
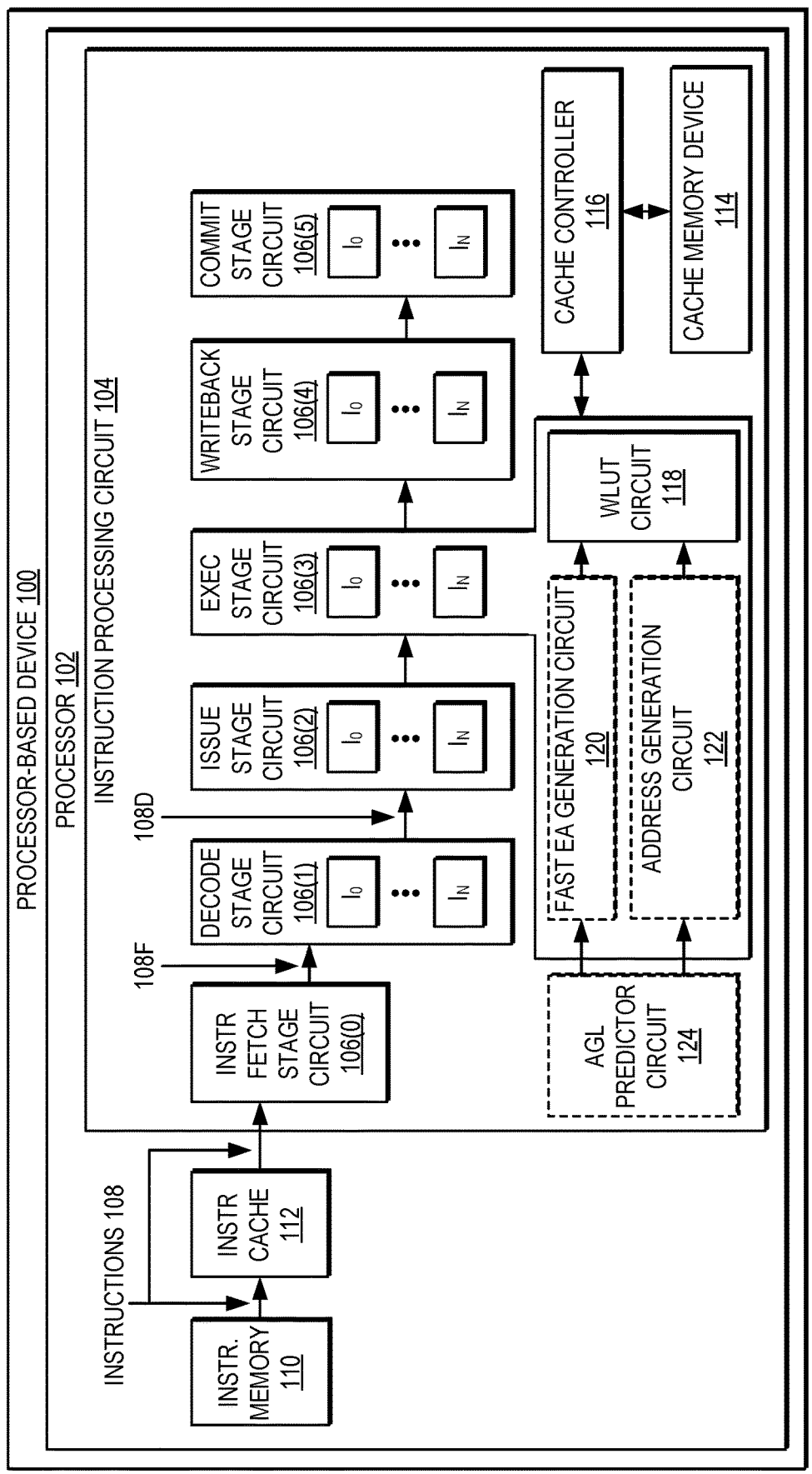
FIG. 1 is a block diagram of an exemplary processor-based system that includes a processor with an instruction processing circuit that includes an instruction fetch circuit that optimizes cache energy consumption, according to some aspects.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects. The terms "first," "second," and the like are used herein to distinguish between similarly named elements, and are not to be interpreted as indicating an ordinal relationship between such elements unless expressly described as such herein.

Aspects disclosed in the detailed description include optimizing cache energy consumption in processor-based devices. Related apparatus, methods, and computer-readable media are also disclosed. In this regard, in some exemplary aspects disclosed herein, a processor-based device comprises an instruction processing circuit that provides, within an execution stage circuit, a way lookup table (WLUT) circuit. The WLUT circuit includes a plurality of WLUT entries that are indexed by corresponding tag addresses. Each WLUT entry comprises a predicted way indicator that indicates a way, within a set of a cache memory device, in which a data value for a memory address that corresponds to the tag address associated with the WLUT entry is predicted to be stored. In exemplary operation, the WLUT circuit receives an effective address (EA) for a memory access request, wherein the EA is the address of a memory location to be accessed when performing the memory access request. The WLUT circuit determines whether a tag portion of the EA corresponds to a tag of a WLUT entry, and, if so, transmits the predicted way indicator of the WLUT entry to a cache controller of the cache memory device. The cache controller then accesses, within a set corresponding to a set portion of the EA, only a predicted tag way and a predicted data way indicated by the predicted way indicator. By accessing only the predicted tag way and the predicted data way instead of probing all ways in parallel, energy consumption of the cache memory device may be reduced when the predicted way indicator correctly predicts the way in which the data is stored.

In some aspects, if the cache controller determines that the WLUT circuit generated a correct predicted way indicator (e.g., by determining that the predicted tag way indicated by the predicted way indicator matches the tag portion of the EA), the cache controller performs the memory access request using data stored in the predicted data way of the cache memory device. For example, the cache controller may update data stored in the predicted data way if the memory access request is a memory write request, or may read data stored in the predicted data way and provide the data to a subsequent pipeline stage circuit if the memory access request is a memory read request. Some aspects may provide that, if the WLUT circuit does not correctly predict the predicted data way, the cache controller may instruct an issue stage circuit to replay one or more instructions that are dependent on the memory access request. The cache controller may also compare the other tag ways within the set (other than the predicted tag way) to the tag portion of the EA and, if a match is found, the data stored by the data way corresponding to the matching tag way may be used to perform the memory access request.

According to some aspects, the functionality of the WLUT circuit may be further enhanced through the use of a fast EA generation circuit to generate and provide the EA to the WLUT circuit. The fast EA generation circuit in such aspects comprises an adder circuit that has a size smaller than an architecturally-defined base address (e.g., a 19-bit adder circuit that is smaller than a 48-bit base address as defined by the Reduced Instruction Set Computer (RISC) architecture). The fast EA address generation circuit generates a first EA using the adder circuit operating on one or more lower bits of a base address and an offset, while a conventional address generation circuit generates a second EA in parallel. If no carry results from the generation of the first EA, the first EA is transmitted to the WLUT circuit as the EA. Otherwise, the second EA is transmitted to the WLUT circuit as the EA.

Some aspects that employ the fast EA address generation circuit may further provide an address generation latency (AGL) prediction circuit to predict whether the fast EA address generation circuit or the address generation circuit will be used to generate the EA. The AGL prediction circuit in such aspects comprises a plurality of program-counter (PC)-indexed AGL entries that each indicates whether an EA corresponding to each PC was previously generated correctly by the fast EA address circuit. Upon receiving a PC as input, the AGL prediction circuit determines whether an AGL entry corresponds to the PC. If so, the AGL prediction circuit, based on the AGL entry, generates a prediction of whether the fast EA generation circuit will be used to generate the EA. The AGL prediction circuit then schedules one or more dependent instructions based on the prediction (i.e., based on an expected delay of whichever of the fast EA generation unit and the conventional address generation unit is predicted to generate the EA).

In some aspects, the cache memory device may be configured to reduce static power consumption using a plurality of drowse circuits corresponding to the plurality of data ways. The plurality of drowse circuits are configured to place the cache lines in each corresponding data way in a drowse state (i.e., in a state in which the voltage provided to each cache line is the minimum voltage required to preserve the data value stored in the cache line) or in a wake state (i.e., in a state in which full voltage is provided to the cache line). Some such aspects may provide that the plurality of data ways are placed in a drowse state on powerup of the processor-based device, and are subsequently placed in a wake state when the predicted tag way indicated by the predicted way indicator in the set corresponding to the set portion of the EA matches the tag portion of the EA.

In this regard, FIG. 1 is a diagram of an exemplary processor-based device 100 that includes a processor 102. The processor 102, which also may be referred to as a "processor core" or a "central processing unit (CPU) core," may be an in-order or an out-of-order processor (OoP), and/or may be one of a plurality of processors 102 provided by the processor-based device 100. In the example of FIG. 1, the processor 102 includes an instruction processing circuit 104 that comprises multiple stage circuits including an instruction fetch stage circuit (captioned as "INSTR FETCH STAGE CIRCUIT" in FIG. 1) 106(0), a decode stage circuit 106(1), an issue stage circuit 106(2), an execution stage circuit (captioned as "EXEC STAGE CIRCUIT" in FIG. 1) 106(3), a writeback stage circuit 106(4), and a commit stage circuit 106(5), which may be collectively referred to herein as a "plurality of pipeline stage circuits 106" or "pipeline stage circuits 106." The instruction processing circuit 104 also includes one or more instruction pipelines $I_0$-$I_N$ for processing instructions 108 fetched from an instruction memory (captioned as "INSTR MEMORY" in FIG. 1) 110 by the instruction fetch stage circuit 106(0) for execution. The instruction memory 110 may be provided in or as part of a system memory in the processor-based device 100, as a non-limiting example. An instruction cache (captioned as "INSTR CACHE" in FIG. 1) 112 may also be provided in the processor 102 to cache the instructions 108 fetched from the instruction memory 110 to reduce latency in the instruction fetch stage circuit 106(0).

The instruction fetch stage circuit 106(0) in the example of FIG. 1 is configured to provide the instructions 108 as fetched instructions 108F into the one or more instruction pipelines $I_0$-$I_N$ in the instruction processing circuit 104 to be pre-processed, before the fetched instructions 108F reach the execution stage circuit 106(3) to be executed. The instruction pipelines $I_0$-$I_N$ are provided across the pipeline stages 106 of the instruction processing circuit 104 to pre-process and process the fetched instructions 108F in a series of steps that can be performed concurrently to increase throughput prior to execution of the fetched instructions 108F by the execution stage circuit 106(3).

With continuing reference to FIG. 1, the decode stage circuit 106(1) is configured to decode each of the fetched instructions 108F fetched by the instruction fetch stage circuit 106(0) into corresponding decoded instructions 108D to determine, e.g., opcodes, operands, addressing modes, instruction types, and/or actions required, as non-limiting examples. Data such as the instruction type and action required encoded in the decoded instructions 108D may also be used to determine into which instruction pipeline $I_0$-$I_N$ the decoded instructions 108D should be placed. In this example, the decoded instructions 108D are placed into one or more of the instruction pipelines $I_0$-$I_N$ and are next provided to the issue stage circuit 106(2), which issues the instructions 108 to an appropriate execution unit. The instructions 108 are next passed to the execution stage circuit 106(3) for execution, and the writeback stage circuit 106(4) writes results of instruction execution to memory (such e.g., cache or system memory, as non-limiting examples) or a register (not shown). Finally, the commit stage circuit 106(5) updates the architectural stage of the processor 102 to reflect the results of instruction execution. It is to be understood that the instruction processing circuit 104 in some aspects may include more, fewer, or different pipeline stage circuits 106 than illustrated in FIG. 1.

The processor 102 of FIG. 1 further comprises a memory hierarchy that includes cache memory devices such as the cache memory device 114. The cache memory device 114 is used to cache local copies of frequently accessed data within the processor 102 for quicker access. In some aspects, the cache memory device 114 may comprise, e.g., a Level 1 (L1) cache. The processor 102 further provides a cache controller 116 to control access to cached data stored by the cache memory device 114, and to manage the cached data using cache replacement and insertion policies. In the example illustrated in FIG. 1, the cache controller 116 is shown as an element separate from the cache memory device 114. However, it is to be understood that the cache controller 116 in some aspects may be provided as an integral element of the cache memory device 114 or vice versa. It is to be further understood that the memory hierarchy of the processor 102 may include additional cache memory devices (not shown), such as a Level 2 (L2) cache, a Level 3 (L3) cache, and/or a last-level cache (LLC).

The cache memory device 114 in the example of FIG. 1 is a set-associative cache that is organized into a plurality of sets (not shown), each of which includes a plurality of ways (not shown) in which a memory block such as a cache line may be stored. As noted above, in set-associative caches such as the cache memory device 114, a copy of data retrieved from a given memory address can be stored in any one of the ways of the set corresponding to the memory address. To minimize access time, conventional set-associative caches are configured to probe all ways in which data may be stored in parallel, even though only the output of the way in which the requested data is stored is used. This may result in significant energy dissipation due to the energy spent accessing the ways in which the requested data is not stored. Static power associated with set-associative caches (i.e., power that is consumed by the set-associative cache when there is no activity) also tends to increase as the memory circuits used to implement set-associative caches become denser.

In this regard, the processor-based device 100 provides a way lookup table (WLUT) circuit (captioned as "WLUT CIRCUIT" in FIG. 1) 118 as part of the execution stage circuit 106(3) of the instruction processing circuit 104. As discussed in greater detail below with respect to FIGS. 2 and 3, the WLUT circuit 118 is configured to receive an EA for a memory access request (e.g., a memory load instruction or a memory write instruction among the instructions 108). As used herein, the term "EA" or "effective address" refers to an address of a memory location to be accessed in performing the memory access request, and in some aspects may be calculated by adding an offset to a base address. If a tag portion of the EA results in a hit in the WLUT circuit 118, the WLUT circuit 118 generates a predicted way indicator that represents a way in which data for the memory access request is predicted to be stored in the cache memory device 114. The WLUT circuit 118 transmits the predicted way indicator to the cache controller 116, which accesses only the predicted tag way and the predicted data way indicated by the predicted way indicator instead of probing all ways. In this manner, energy consumption of the cache memory device 114 may be reduced when the predicted way indicator is correct. The cache controller 116 then performs the memory access request using data stored in the predicted data way of the cache memory device 114.

Because the WLUT circuit 118 is part of the execution stage circuit 106(3), it is desirable to minimize the processing time required to generate the predicted way indicator. The processor-based device 100 in some aspects thus may provide a fast EA generation circuit 120 to generate and provide the EA to the WLUT circuit 118. The fast EA generation circuit 120 in such aspects comprises an adder circuit (not shown) that has a size smaller than an architecturally-defined base address, and may generates a first EA (not shown) using the adder circuit operating on one or more lower bits of a base address and an offset. If no carry results from the generation of the first EA, the fast EA generation circuit 120 transmits the first EA to the WLUT circuit 118 as the EA to be used when generating the predicted way indicator. Otherwise, an address generation circuit 122 generates a second EA (not shown) in conventional fashion in parallel with the fast EA generation circuit 120 generating the first EA, and transmits the second EA to the WLUT circuit 118 as the EA to be used when generating the predicted way indicator. Some aspects that further provide an address generation latency (AGL) predictor circuit 124 to predict whether the fast EA generation circuit 120 or the address generation circuit 122 should be used to generate the EA, and schedules dependent instructions accordingly. The functionality of the fast EA generation circuit 120, the address generation circuit 122, and the AGL predictor circuit 124 are discussed in greater detail below with respect to FIGS. 2 and 4.

In some aspects, the cache memory device 114 may also be configured to reduce static power consumption using a plurality of drowse circuits (not shown) corresponding to the plurality of data ways. The plurality of drowse circuits are configured to place the cache lines in each corresponding data way in a drowse state (i.e., in a state in which the voltage provided to each cache line is the minimum voltage required to preserve the data value stored in the cache line) or in a wake state (i.e., in a state in which full voltage is provided to the cache line). Some such aspects may provide that the plurality of data ways are placed in a drowse state initially, and are subsequently placed in a wake state when a predicted tag way indicated by the predicted way indicator in the set corresponding to the set portion of the EA matches the tag portion of the EA. The functionality of the drowse circuits of the cache memory device 114 are discussed in greater detail below with respect to FIGS. 2 and 5.

Figure 2:
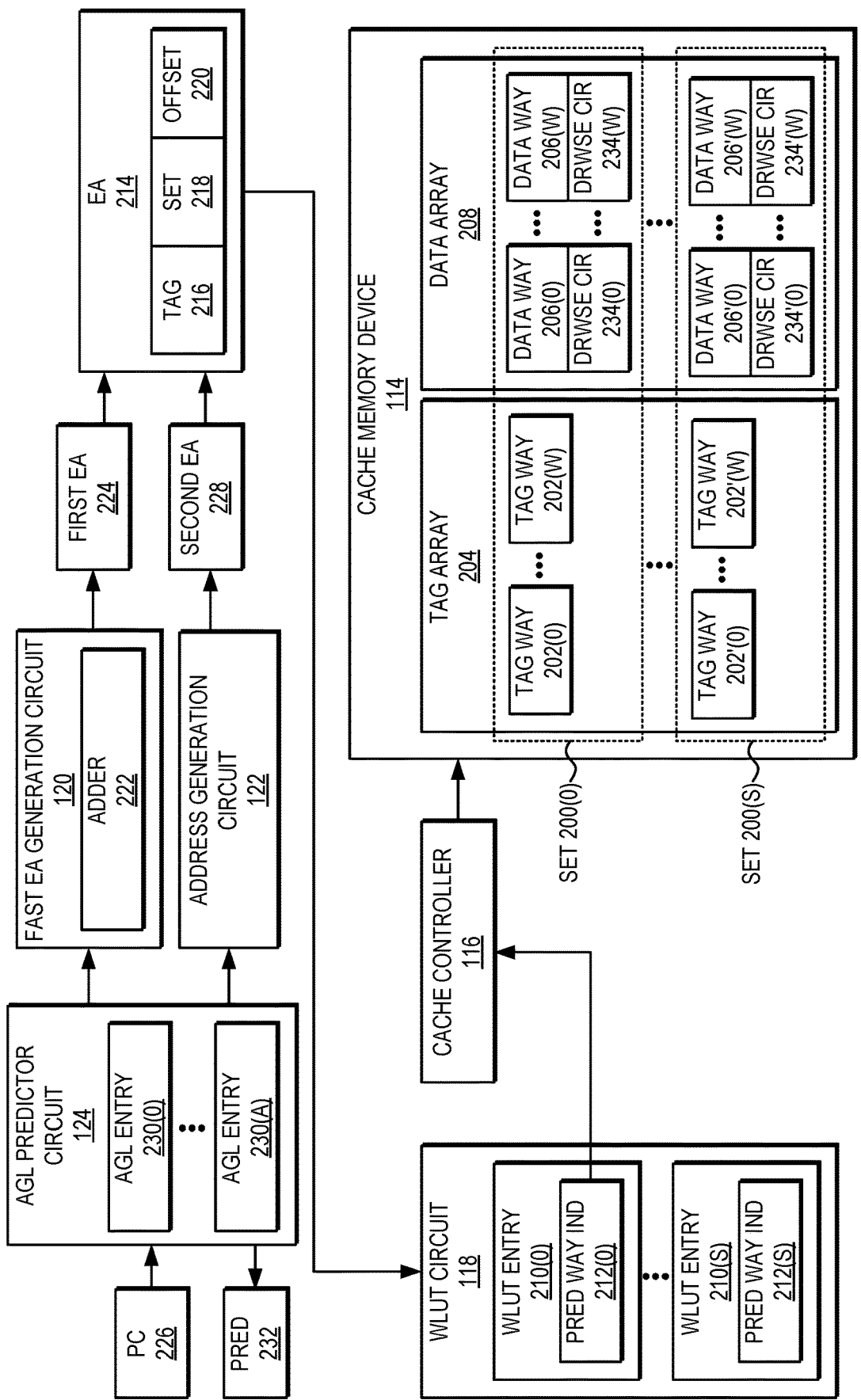
FIG. 2 is a block diagram illustrating exemplary elements of the cache memory device, the cache controller, the way lookup table (WLUT) circuit, the fast effective address (EA) generation circuit, and the address generation latency (AGL) predictor circuit of FIG. 1 for optimizing cache energy consumption, according to some aspects.

FIG. 2 illustrates in greater detail exemplary elements of the cache memory device 114, the cache controller 116, WLUT circuit 118, the fast EA generation circuit 120, and the AGL predictor circuit 124 of FIG. 1 for optimizing cache energy consumption, according to some aspects. In describing FIG. 2, the functionality of the cache controller 116 and the WLUT circuit 118 for predicting ways is first described, followed by the functionality of the AGL predictor circuit 124 and the fast EA generation circuit 120 for generating EAs for use by the WLUT circuit 118, and finally the functionality of the cache memory device 114 for placing data ways in a drowse state or in a wake state. Elements of FIG. 1 are referenced in describing FIG. 2, for the sake of clarity.

As seen in FIG. 2, the cache memory device 114, which as noted above with respect to FIG. 1 is a set-associative cache, is organized into multiple sets 200(0)-200(S). Each of the sets 200(0)-200(S) is subdivided into a plurality of tag ways 202(0)-202(W), 202'(0)-202'(W) of a tag array 204, and a corresponding plurality of data ways 206(0)-206(W), 206'(0)-206'(W) of a data array 208. The data ways 206(0)-206(W), 206'(0)-206'(W) each can store a memory block (i.e., a cache line) that is read, e.g., from system memory or from another cache, for faster access by the processor 102 of FIG. 1.

To optimize energy consumption by the cache memory device 114, the WLUT circuit 118 is provided. The WLUT circuit 118 comprises a content-addressable memory (CAM) that includes a plurality of WLUT entries 210(0)-210(S). The WLUT entries 210(0)-210(S) are indexed by tags of corresponding EAs, and, in some aspects, correspond in number to a count of the plurality of sets 200(0)-200(S) of the cache memory device 114. Each of the WLUT entries 210(0)-210(S) comprises a corresponding predicted way indicator (captioned as "PRED WAY IND" in FIG. 2) 212(0)-212-(S), which, according to some aspects, has a size in bits equal to a base two (2) logarithm of a count of the number of tag ways 202(0)-202(W), 202'(0)-202'(W) and data ways 206(0)-206(W), 206'(0)-206'(W). Thus, for example, if the cache memory device 114 is a four-way set-associative cache having a size of 16 kilobytes, the WLUT circuit 118 may contain 4,096 WLUT entries 210 (0)-210(S), with each predicted way indicator 212(0)-212-(S) having a size of two (2) bits (i.e., $\log_2(4)$). Some aspects may provide that the WLUT entries 210(0)-210(S) each may contain additional data not shown in FIG. 2, such as validity indicators for each of the predicted way indicators 212(0)-212(S). The WLUT circuit 118 in some aspects may maintain the WLUT entries 210(0)-210(S) using a Most-Recently-Used (MRU) algorithm, as a non-limiting example.

In exemplary operation, the WLUT circuit 118 receives an EA 214 that comprises a tag portion (captioned as "TAG" in FIG. 2) 216, a set portion (captioned as "SET" in FIG. 2) 218, and an offset portion (captioned as "OFFSET" in FIG. 2) 220. The tag portion 216 comprises a set of upper bits of the EA 214. When data that is stored in memory at the EA 214 is cached in one of the data ways 206(0)-206(W), 206'(0)-206'(W) in the cache memory device 114, the tag portion of the EA 214 is stored in one of the tag ways 202(0)-202(W), 202'(0)-202(W) that corresponds to the data ways 206(0)-206(W), 206'(0)-206'(W) in which the data is cached. The tag portion 216 is also used as an index into the WLUT entries 210(0)-210(S) of the WLUT circuit 118 for the EA 214. If the WLUT circuit 118 determines that the tag portion 216 of the EA 214 corresponds to a tag of a WLUT entry such as the WLUT entry 210(0), the WLUT circuit 118 transmits the predicted way indicator 212(0) to the cache controller 116.

Assume for the sake of illustration that the predicted way indicator 212(0) of the WLUT entry 210(0) has a value of zero (0). Upon receiving the predicted way indicator 212(0) having a value of zero (0), the cache controller 116 identifies, based on the set portion 218 (i.e., a set of bits within the middle of the EA 214) of the EA 214, which of the sets 200(0)-200(S) in the cache memory device 114 may cache data for the EA 214. In this example, assume that the set 200(0) is identified as the set corresponding the EA 214. Instead of probing all of the tag ways 202(0)-202(W) and the data ways 206(0)-206(W) in parallel in conventional fashion, the cache controller 116 accesses only the predicted tag way 202(0) and the predicted data way 206(0), as indicated by the predicted way indicator 212(0), within the set 200(0).

The cache controller 116 may then compare the predicted tag way 202(0) with the tag portion 216 of the EA 214 to determine whether the predicted way indicator 212(0) is correct. If the predicted tag way 202(0) matches the tag portion 216 of the EA 214, the cache controller 116 may perform the memory access request using data stored in the predicted data way 206(0). For example, if the memory access request comprises a memory write request, performing the memory access request may comprise updating the data stored in the predicted data way 206(0) with write data (not shown) of the memory write request. If memory access request comprises a memory read request, the cache controller 116 may read data stored in the predicted data way 206(0), and then provide the data to a subsequent pipeline stage circuit 106 of the instruction processing circuit 104 (i.e., a pipeline stage circuit following the execution stage circuit 106(3), such as the writeback stage circuit 106(4)).

If the predicted tag way 202(0) is determined to be a misprediction (i.e., because the predicted tag way 202(0) does not match the tag portion 216 of the EA 214), the cache controller 116 according to some aspects instructs the issue stage circuit 106(2) to replay one or more instructions 108 that are dependent on the memory access request (instead of flushing all of the instructions 108 in conventional fashion). This results in a latency of at most one (1) processor cycle. The cache controller 116 may then compare the other tag ways 202(1)-202(W), excluding the predicted tag way 202(0), with the tag portion 216. If one of the other tag ways 202(1)-202(W), such as the tag way 202(W), matches the tag portion 216, the cache controller 116 performs the memory access request using the data stored in the corresponding data way 206(W) (e.g., by reading data stored in the data way 206(W) and providing the data to a subsequent pipeline stage circuit 106).

As discussed in greater detail below with respect to FIG. 3, the WLUT entries 210(0)-210(S) of the WLUT circuit 118 may be populated and updated after each memory access request is performed by the cache controller 116. In addition, some aspects may provide that the WLUT circuit 118 may invalidate one or more of the WLUT entries 210(0)-210(S) in response to an occurrence of an invalidation condition. Such invalidation conditions may include, as non-limiting examples, a powerup of the processor-based device 100, a virtual address (VA) to physical address (PA) mapping change, a change of a way corresponding to a tag, and an eviction of a cache line.

With continuing reference to FIG. 2, the functionality of the AGL predictor circuit 124 and the fast EA generation circuit 120 for generating the EA 214 for use by the WLUT circuit 118 is now discussed. Because the WLUT circuit 118 is implemented as part of the execution stage circuit 106(3) of FIG. 1, it is within the critical path of the instruction processing circuit 104, and therefore the time taken by the WLUT circuit 118 should be minimized. The fast EA generation circuit 120 is provided to speed up generation of the EA 214 under some circumstances. The functionality of the fast EA generation circuit 120 is based on the recognition that EAs are generated by adding a base address to an offset. Conventional address generation circuits generate an EA using an adder circuit that is the same size as an architecturally-defined base address (e.g., a 48-bit adder circuit is used for conventional RISC architectures to add a 48-bit base address and a 16-bit offset). However, many of the upper bits of the adder are only used to propagate carries from the addition of the least significant bits, with the carry propagation ending upon reading the first zero (0) in the base address and the remaining upper bits remaining unchanged.

Thus, the fast EA generation circuit 120 provides an adder 222 that is smaller than the architecturally-defined base address of the processor-based device 100 of FIG. 1. For example, if the processor-based device 100 is based on the RISC architecture, the adder 222 may be a 19-bit adder, which can perform addition using the lower 19 bits of a 48-bit base address and a 16-bit offset faster than a conventional 48-bit adder can add the 48-bit base address and the 16-bit offset. In exemplary operation, the fast EA generation circuit 120, using a base address and an offset determined by an instruction 108 corresponding to the memory access request, generates a first EA 224 using the adder 222, and the address generation circuit 122 generates the second EA 228 in parallel in conventional fashion. If the results of generating the first EA 224 do not result in a carry (that would need to be propagated to a next higher bit beyond the size of the adder 222), then the first EA 224 is provided to the WLUT circuit 118 as the EA 214. However, if the results of generating the first EA 224 do result in a carry, then the second EA 228 is provided to the WLUT circuit 118 as the EA 214.

Because generation of the first EA 224 by the fast EA generation circuit 120 and generation of the second EA 228 by the address generation circuit 122 each incurs different delays, dependent instructions may need to be scheduled differently depending on which of the fast EA generation circuit 120 and the address generation circuit 122 ultimately generates the EA 214. Accordingly, some aspects provide the AGL predictor circuit 124 of FIGS. 1 and 2 to predict which of the fast EA generation circuit 120 and the address generation circuit 122 will be used. As shown in FIG. 2, the AGL predictor circuit 124 comprises a plurality of AGL entries 230(0)-230(A), each of is indexed by a PC such as the PC 226 and stores a bit indicator that indicates whether the fast EA generation circuit 120 previously correctly generated an EA for the corresponding PC.

In exemplary operation, the AGL predictor circuit 124 receives the PC 226 of the memory access request. During the issue queue stage of the issue stage circuit 106(2), the AGL predictor circuit 124 determines whether an AGL entry (e.g., the AGL entry 230(0) of FIG. 2) among the plurality of AGL entries 230(0)-230(A) corresponds to the PC 226. If so, the AGL predictor circuit 124 generates, based on the AGL entry 230(0), a prediction (captioned as "PRED" in FIG. 2) 232 of whether the fast EA generation circuit 120 will be used to generate the EA 214. The AGL predictor circuit 124 then schedules (e.g., by communicating with the appropriate pipeline stage circuit 106 of the instruction processing circuit 104) one or more dependent instructions 108 based on the prediction 232. This may involve, e.g., scheduling the one or more dependent instructions 108 based on an expected delay of whichever of the fast EA generation circuit 120 and the address generation circuit 122 is predicted to generate the EA 214. The writeback stage circuit 106(4) of the instruction processing circuit 104 subsequently updates the AGL entry 230(0) for the PC 226 corresponding to the memory access request to indicate whether or not the fast EA generation circuit 120 correctly generated the EA 214 for the PC 226. In some aspects in which the memory access request is a memory load request, if the prediction 232 indicates that the fast EA generation circuit 120 will be used to generate the EA 214 but the prediction 232 turns out to be incorrect, any dependent instructions 108 that were issued based on the prediction 232 are replayed.

If the cache controller 116 determines that the predicted tag way 202(0) matches the tag portion 216 of the EA 214, the cache controller 116 in some aspects may place all of the plurality of data ways 206(0)-206(W) other than the predicted data way 206(0) within the set 200(0) in a drowse state using corresponding drowse circuits of a plurality of drowse circuits (captioned as "DRWSE CIR" in FIG. 2) 234(0)-234(W), 234'(0)-234'(W) of the cache memory device 114.

If the cache controller 116 determines that the second tag way 202(W) indicated by the predicted way indicator 212(0) among the tag ways 202(0)-202(W) in the set 200(0) corresponding to the set portion 218 of the EA 214 does not match the tag portion 216 of the EA 214, the cache controller 116 in some aspects may place all data ways of the plurality of data ways 206(0)-206(W) in the set 200(0) in a wake state using corresponding drowse circuits of the plurality of drowse circuits 234(0)-234(W). The cache controller 116 may further determine whether a cache miss results on the EA 214. If so, the cache controller 116 places the predicted data way 206(0) in a wake state using a drowse circuit 234(0) of the plurality of drowse circuits 234(0)-234(W) corresponding to the predicted data way 206(0). The cache controller 116 also updates the data stored in the predicted data way 206(0). If the cache controller 116 determines that a cache miss does not result on the EA 214, the cache controller 116 places all ways other than the predicted data way 206(0) in the set 200(0) in a drowse state using corresponding drowse circuits of the plurality of drowse circuits 234(0)-234(W).

With further reference to FIG. 2, the functionality of the cache memory device 114 for reducing static power consumption by placing the data ways 206(0)-206(W), 206'(0)-206'(W) in a drowse state or in a wake state is now discussed. As noted above, static power associated with set-associative caches (i.e., power that is consumed by the set-associative cache when there is no activity) such as the cache memory device 114 tends to increase as the memory circuits used to implement set-associative caches become denser. One conventional approach to reducing static power consumption involves "collapsing" the cache lines stored in the data ways 206(0)-206(W), 206'(0)-206'(W) by essentially turning the data ways 206(0)-206(W), 206'(0)-206'(W) off when not in use. However, this approach incurs additional latency, because the data stored in the data ways 206(0)-206(W), 206'(0)-206'(W) is lost when the data ways 206(0)-206(W), 206'(0)-206'(W) are turned off, and must be re-retrieved from system memory or higher level caches when the data ways 206(0)-206(W), 206'(0)-206'(W) are turned on again.

Accordingly, as seen in FIG. 2, the cache memory device 114 provides the drowse circuits 234(0)-234(W), 234'(0)-234'(W) corresponding to the data ways 206(0)-206(W), 206'(0)-206'(W). Each of the drowse circuits 234(0)-234(W), 234'(0)-234'(W) is configured to place the corresponding data ways 206(0)-206(W), 206'(0)-206'(W) either in a "drowse" state (i.e., which the voltage provided to each cache line is the minimum voltage required to preserve the data value stored in the cache line) or in a "wake" state (i.e., in a state in which full voltage is provided to the cache line). In exemplary operation, the drowse circuits 234(0)-234(W), 234'(0)-234(W) initially place the data ways 206(0)-206(W), 206'(0)-206'(W) in a drowse state upon powerup of the processor-based device 100 of FIG. 1. The drowse circuits 234(0)-234(W), 234'(0)-234'(W) may subsequently place the data ways 206(0)-206(W), 206'(0)-206'(W) corresponding to WLUT entries 210(0)-210(S) in the WLUT circuit 118 in a wake state while maintaining the remainder of the data ways 206(0)-206(W), 206'(0)-206'(W) in a drowse state. If a cache miss results on the cache memory device 114 for the EA 214, the cache controller 116 may place the predicted data way 206(0) in a wake state using the corresponding drowse circuit 234(0), update the data stored in the predicted data way 206(0), and place the predicted data way 206(0) in a drowse state using the corresponding drowse circuit 234(0). If the EA 214 is determined not to match any WLUT entries 210(0)-210(S), the cache controller 116 may place all of the data ways 206(0)-206(W) in the set 200(0) in a wake state using the corresponding drowse circuits 234(0)-234(W).

Figure 3:
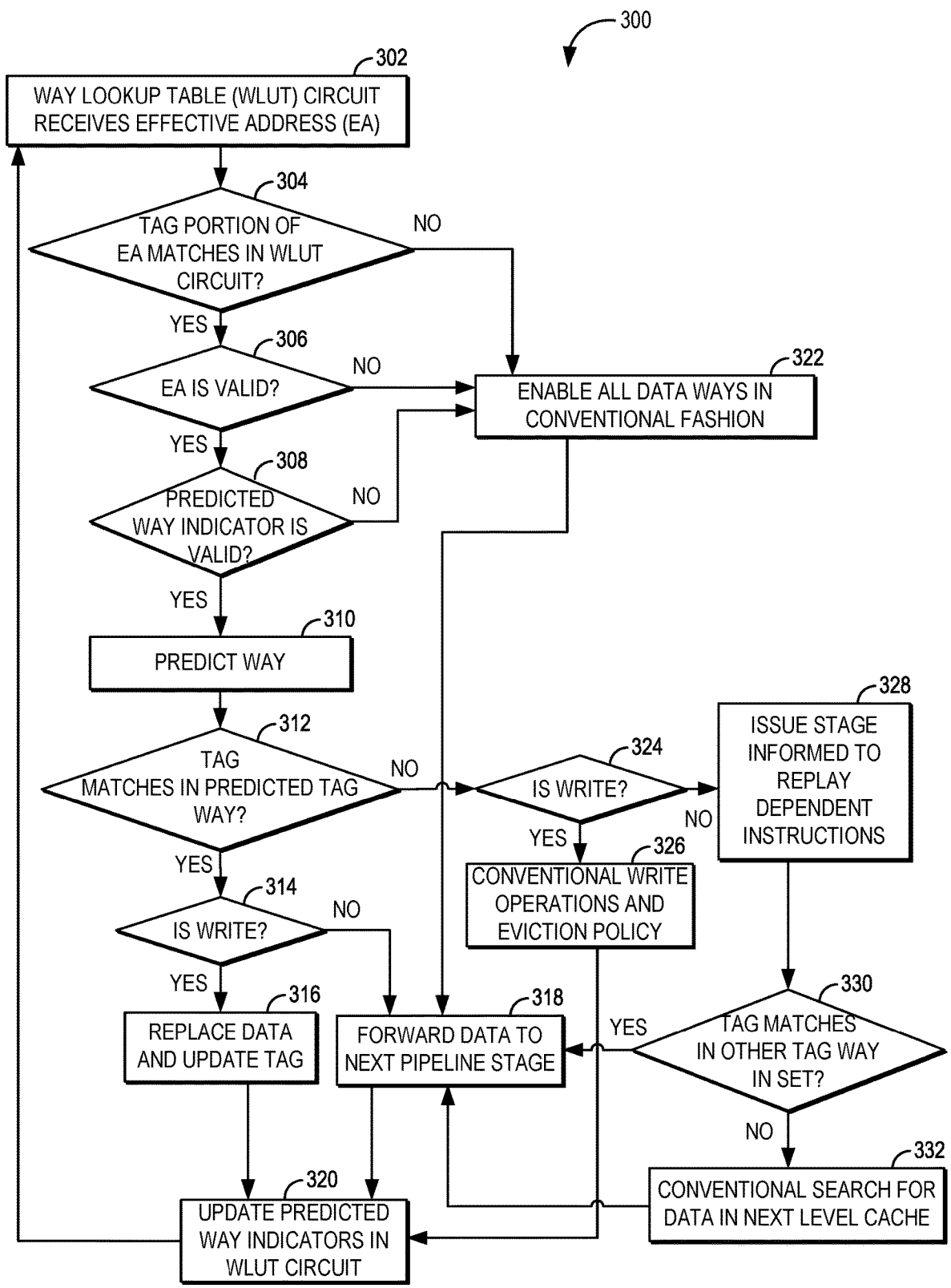
FIG. 3 provides a flowchart illustrating an exemplary logical flow performed by the WLUT circuit and the cache controller of FIGS. 1 and 2 for optimizing cache energy consumption, according to some aspects.

FIG. 3 provides a flowchart illustrating an exemplary logical flow 300 performed by the cache controller 116 and the WLUT circuit 118 of FIGS. 1 and 2 for optimizing cache energy consumption, according to some aspects. Elements of FIGS. 1 and 2 are referenced in describing FIG. 3 for the sake of clarity. In FIG. 3, the logical flow 300 begins with the WLUT circuit 118 receiving the EA 214 (block 302). The WLUT circuit 118 next determines whether the tag portion 216 of the EA 214 matches in the WLUT circuit 118 (i.e., whether the tag portion 216 results in a hit on one of the WLUT entries 210(0)-210(S), such as the WLUT entry 210(0)) (block 304). If so, the WLUT circuit 118 next determines whether the EA 214 is valid (block 306). If the EA 214 is determined to be valid, the WLUT circuit 118 determines whether the predicted way indicator 212(0) (of the WLUT entry 210(0)) is valid (block 308). If so, the WLUT circuit 118 predicts the way of the cache memory device 114 indicated by the predicted way indicator 212(0) as the way storing data corresponding to the EA 214 (block 310).

The cache controller 116 next determines whether the tag portion 216 of the EA 214 matches in the predicted tag way (e.g., the tag way 202(0)) (block 312). If so, the cache controller 116 determines whether the memory access request to which the EA 214 corresponds is a memory write request (block 314). If the memory access request is a memory write request, the cache controller 116 replaces the data stored in the predicted data way (e.g., the data way 206(0)), and updates the tag way 202(0) (block 316). If the memory access request is a memory read request, the cache controller 116 forwards the data stored in the predicted data way 206(0) to a next pipeline stage circuit (e.g., the writeback stage circuit 106(4) of FIG. 1) (block 318). The WLUT circuit 118 then updates valid tags (if provided) and predicted way indicators in the WLUT circuit 118 (block 320). The logical flow 300 then returns to block 302.

If the WLUT circuit 118 determines at decision block 304 that the tag portion 216 of the EA 214 does not match any of the WLUT entries 210(0)-210(S), or determines at decision block 306 that the EA 214 is not valid, or determines at decision block 308 that the predicted way indicator 212(0) is not valid, the WLUT circuit 118 indicates to the cache controller 116 to enable all of the data ways 206(0)-206(W), 206'(0)-206'(W) in conventional fashion (block 322). The logical flow 300 then continues at block 318.

If the cache controller 116 determines at decision block 312 that the tag portion 216 of the EA 214 does not match the predicted tag way 202(0), the cache controller 116 determines whether the memory access request to which the EA 214 corresponds is a memory write request (block 324). If so, the cache controller 116 performs conventional cache write operations and applies a conventional eviction policy (block 326). The logical flow 300 then continues at block 320. If the memory access request is determined at decision block 324 to be a memory read request, the cache controller 116 informs the issue stage circuit 106(2) to replay dependent instructions such as the instructions 108 (block 328). The cache controller 116 also determines whether the tag portion 216 of the EA 214 matches any of the other tag ways 202(1)-202(W) in the set 200(0) (block 330). If so, the logical flow 300 continues at block 318. If not, the cache controller 116 performs a conventional search for the requested data in a next-level cache (block 332). The logical flow 300 then continues at block 318.

Figure 4:
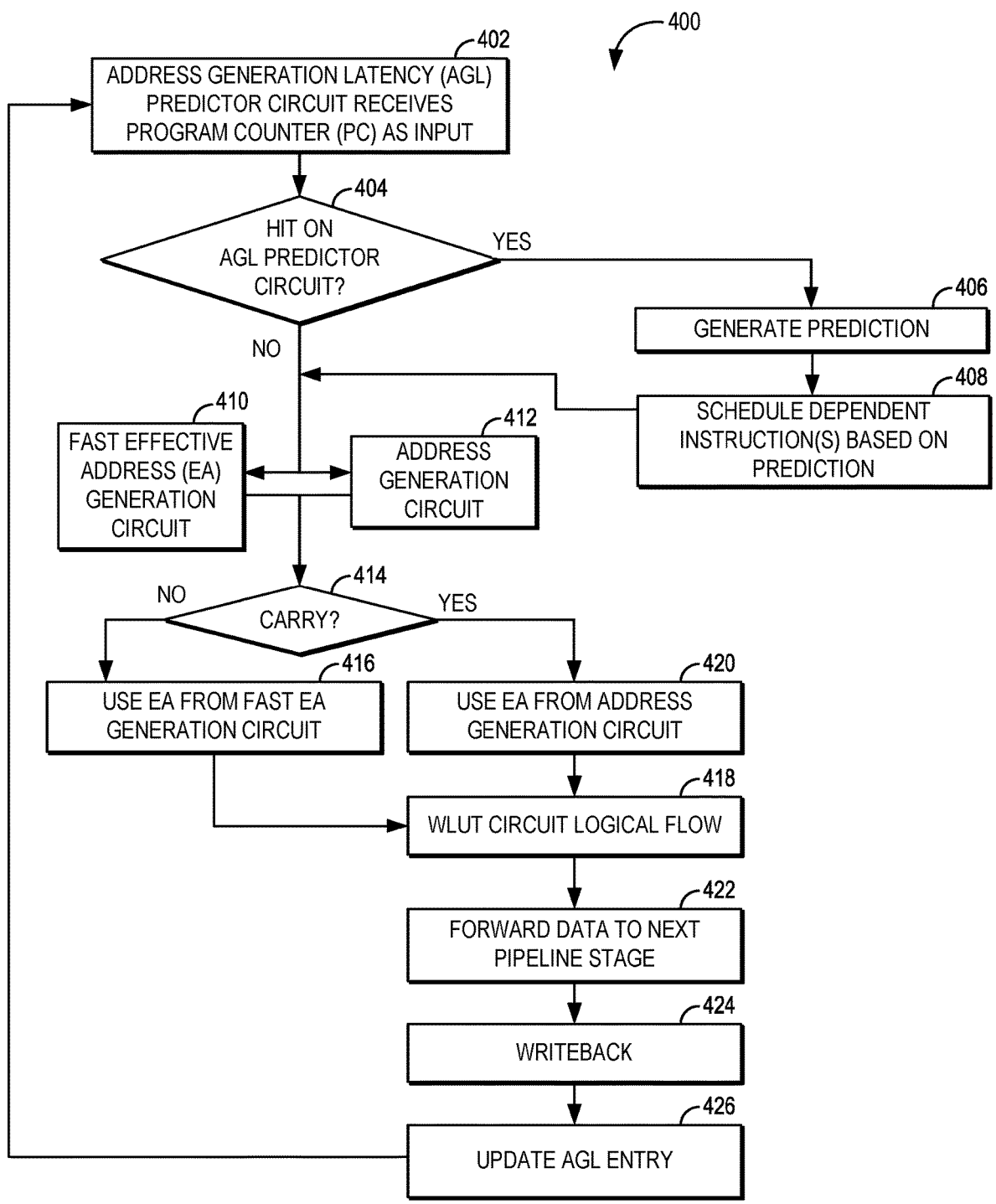
FIG. 4 provides a flowchart illustrating an exemplary logical flow performed by the AGL predictor circuit, the address generation circuit, and the fast EA generation circuit of FIGS. 1 and 2 for generating an EA for use by the WLUT circuit of FIGS. 1 and 2, according to some aspects.

FIG. 4 provides a flowchart illustrating an exemplary logical flow 400 performed by the fast EA generation circuit 120, the address generation circuit 122, and the AGL predictor circuit 124 of FIGS. 1 and 2 for generating the EA 214 for use by the WLUT circuit 118 of FIGS. 1 and 2, according to some aspects. For the sake of clarity, elements of FIGS. 1 and 2 are referenced in describing FIG. 4. In FIG. 4, the logical flow 400 begins with the AGL predictor circuit 124 receiving the PC 226 as input (block 402). The AGL predictor circuit 124 then determines whether the PC 226 results in a hit on the AGL predictor circuit 124 (i.e., the PC 226 corresponds to one of the AGL entries 230(0)-230(A) of the AGL predictor circuit 124, such as the AGL entry 230(0)) (block 404). If so, the AGL predictor circuit 124 generates, based on the AGL entry 230(0), the prediction 232 of whether the fast EA generation circuit 120 will be used to generate the EA 214 (block 406). The AGL predictor circuit 124 then schedules one or more dependent instructions 108 based on the prediction 232 (block 408). The logical flow 400 then continues at blocks 410 and 412.

If the AGL predictor circuit 124 determines at decision block 404 that the PC 226 does not result in a hit on the AGL predictor circuit 124, the fast EA generation circuit 120 generates the first EA 224 (block 410). The address generation circuit 122 also generates the second EA 228 in parallel with the fast EA generation circuit 120 generating the first EA 224 (block 412). The instruction processing circuit 104 then determines whether the generation of the first EA 224 by the fast EA generation circuit 120 resulted in a carry beyond the highest bit of the adder 222 (block 414). If not, the first EA 224 generated by the fast EA generation circuit 120 is used as the EA 214 (block 416). The logical flow 400 then continues at block 418. However, if it is determined at decision block 414 that a carry did result, the second EA 228 generated by the address generation circuit 122 is used as the EA 214 (block 420).

The logical flow 300 performed by the WLUT circuit 118 as described in FIG. 3 is then performed using the EA 214 (block 418). When complete, the cache controller 116 forwards data resulting from performing the memory access request to a next pipeline stage circuit (e.g., the writeback stage circuit 106(4)) (block 422). The writeback stage circuit 106(4) performs writeback operations (block 424). The writeback stage circuit 106(4) also updates an AGL entry among the AGL entries 230(0)-230(A) to indicate whether the fast EA generation circuit 120 successfully generated the EA 214 for the PC 226 (block 426). The logical flow 400 then returns to block 402.

Figure 5:
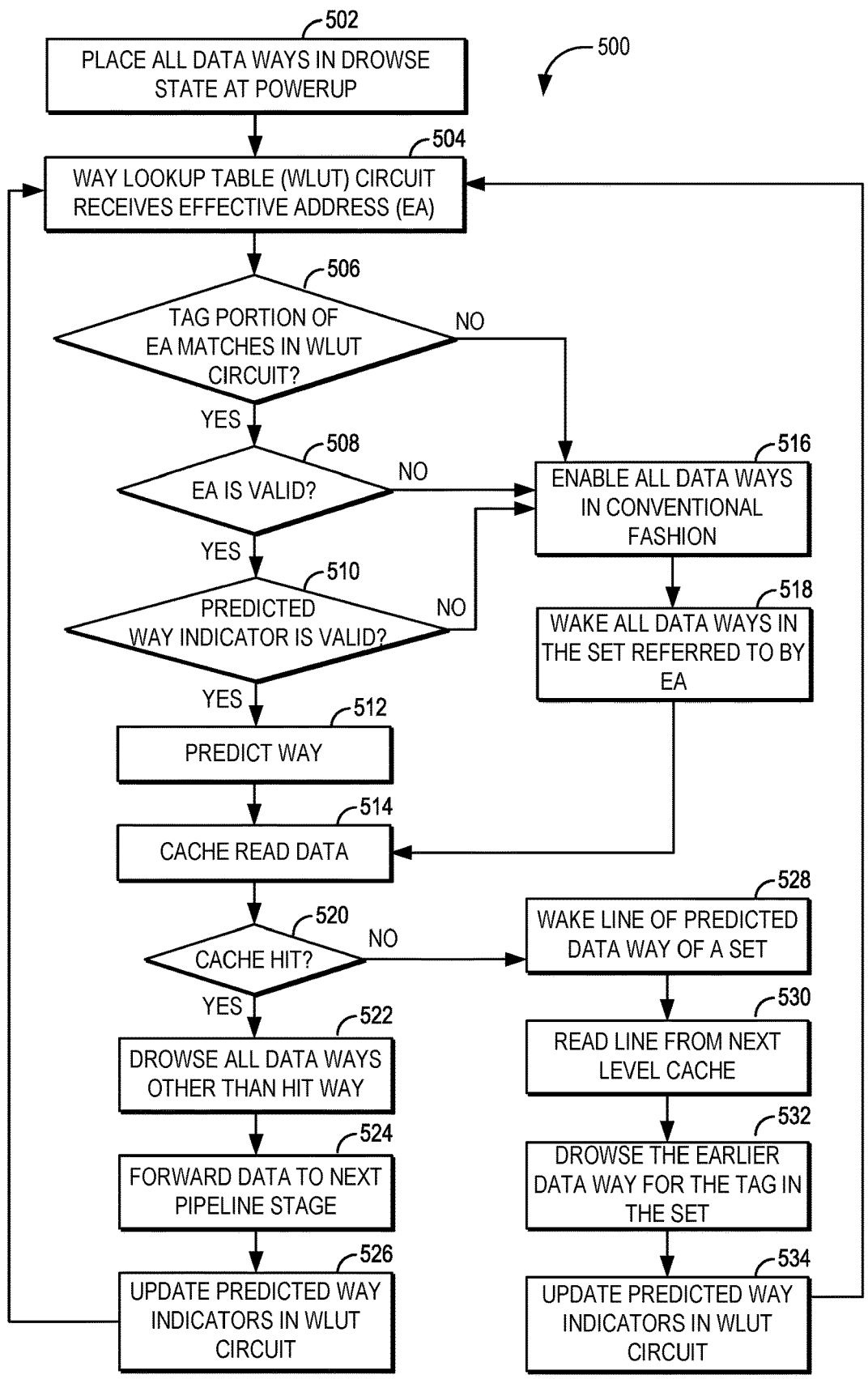
FIG. 5 provides a flowchart illustrating an exemplary logical flow performed by the cache memory device, the cache controller, and the WLUT circuit of FIGS. 1 and 2 for placing data ways of the cache memory device in a drowse state when not is use and in a wake state when in use, according to some aspects.

FIG. 5 provides a flowchart illustrating an exemplary logical flow 500 performed by the cache memory device 114, the cache controller 116, and the WLUT circuit 118 of FIGS. 1 and 2 for placing the data ways 206(0)-206(W), 206'(0)-206'(W) of the cache memory device 114 in a drowse state when not in use and in a wake state when in use, according to some aspects. Elements of FIGS. 1 and 2 are referenced in describing FIG. 5 for the sake of clarity. In FIG. 5, the logical flow 500 begins with the cache controller 116 placing the data ways 206(0)-206(W), 206'(0)-206'(W) in a drowse state at powerup of the processor-based device 100, using the drowse circuits 234(0)-234(W), 234'(0)-234'(W) (block 502). The WLUT circuit 118 subsequently receives the EA 214 (block 504). The WLUT circuit 118 next determines whether the tag portion 216 of the EA 214 matches in the WLUT circuit 118 (i.e., whether the tag portion 216 results in a hit on one of the WLUT entries 210(0)-210(S), such as the WLUT entry 210(0)) (block 506). If so, the WLUT circuit 118 next determines whether the EA 214 is valid (block 508). If the EA 214 is determined to be valid, the WLUT circuit 118 determines whether the predicted way indicator 212(0) (of the WLUT entry 210(0)) is valid (block 510). If so, the WLUT circuit 118 predicts the way of the cache memory device 114 indicated by the predicted way indicator 212(0) as the way storing data corresponding to the EA 214 (block 512). The logical flow 500 then continues at block 514.

If the WLUT circuit 118 determines at decision block 506 that the tag portion 216 of the EA 214 does not match any of the WLUT entries 210(0)-210(S), or determines at decision block 508 that the EA 214 is not valid, or determines at decision block 510 that the predicted way indicator 212(0) is not valid, the WLUT circuit 118 indicates to the cache controller 116 to enable all of the data ways 206(0)-206(W), 206'(0)-206'(W) in conventional fashion (block 516). The cache controller 116 also places the data ways 206(0)-206(W) in the set 200(0) referred to by the EA 214 in a wake state using the drowse circuits 234(0)-234(W) (block 518). The logical flow 500 then continues at block 514.

The cache controller 116 next attempts to read data from the cache memory device 114 for the memory access request (block 514). The cache controller 116 then determines whether a cache hit resulted from the attempt (block 520). If so, the cache controller 116 places all of the data ways 206(0)-206(W), 206'(0)-206'(W) other than the data way resulting in the cache hit in a drowse state using the corresponding drowse circuits 234(0)-234(W) (block 522). The cache controller 116 forwards data resulting from performing the memory access request to a next pipeline stage circuit (e.g., the writeback stage circuit 106(4)) (block 524). The WLUT circuit 118 then updates valid tags (if provided) and predicted way indicators 212(0)-212(S) in the WLUT circuit 118 (block 526). The logical flow 500 then returns to block 504.

If the cache controller 116 determines at decision block 520 that a cache miss results from the attempt to read data from the cache memory device 114, the cache controller 116 wakes the cache line of the predicted data way 206(0) of the set 200(0) (block 528). The cache controller 116 reads the requested cache line from a next level cache (block 530). The cache controller 116 also places the earlier data way among the data ways 206(0)-206(W) for the tag portion 216 in the set 200(0) in a drowse state using the corresponding drowse circuit 234(0)-234(W) (block 532). The WLUT circuit 118 then updates the predicted way indicators 212(0)-212(S) in the WLUT circuit 118 (block 534). The logical flow 500 then returns to block 504.

To illustrate exemplary operations performed by the instruction processing circuit 104 of FIG. 1 for optimizing cache energy consumption according to some aspects, FIGS. 6A-6D provide a flowchart illustrating exemplary operations 600. For the sake of clarity, elements of FIGS. 1 and 2 are referenced in describing FIGS. 6A-6D. It is to be understood that, in some aspects, some of the exemplary operations 600 may be performed in an order other than that illustrated herein, and/or may be omitted.

Figure 6A:
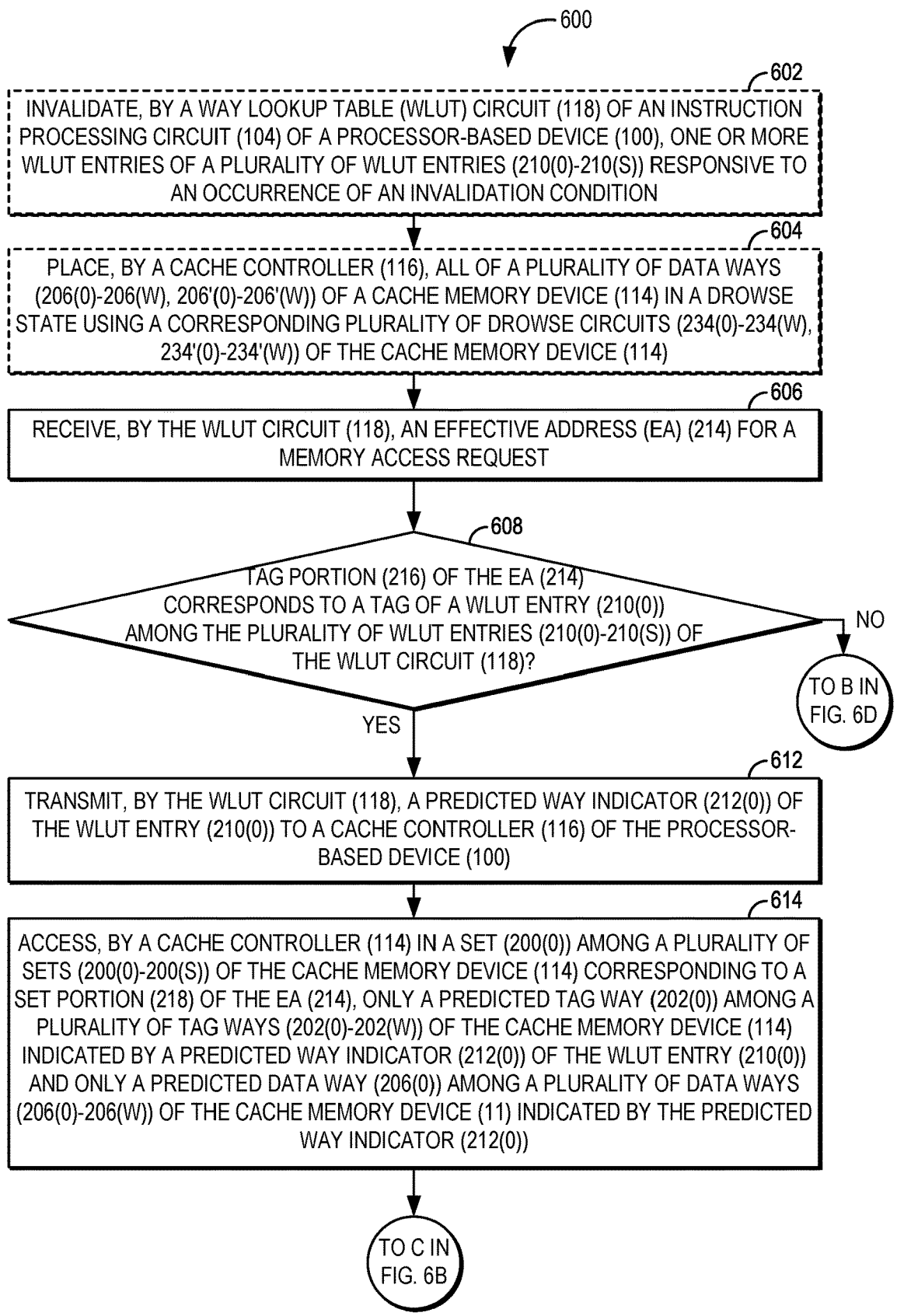
FIGS. 6A-6D provide a flowchart illustrating exemplary operations performed by the instruction processing circuit of FIG. 1, including the WLUT circuit and the cache controller of FIGS. 1 and 2 for optimizing cache energy consumption, according to some aspects.

In the example of FIG. 6A, operations in some aspects begin with a WLUT circuit (e.g., the WLUT circuit 118 of FIGS. 1 and 2) of an instruction processing circuit (such as the instruction processing circuit 104 of FIG. 1) of a processor-based device (e.g., the processor-based device 100 of FIG. 1) invaliding one or more WLUT entries of a plurality of WLUT entries (such as the WLUT entries 210(0)-210(S) of FIG. 2) responsive to an occurrence of an invalidation condition (block 602). A cache controller (e.g., the cache controller 116 of FIGS. 1 and 2) may also place all of a plurality of data ways (such as the data ways 206(0)-206(W), 206'(0)-206'(W) of FIG. 2) of a cache memory device (e.g., the cache memory device 114 of FIGS. 1 and 2) in a drowse state using a corresponding plurality of drowse circuits (such as the drowse circuits 234(0)-234(W), 234'(0)-234'(W) of FIG. 2) of the cache memory device 114 (block 604).

The WLUT circuit 118 receives an EA (e.g., the EA 214 of FIG. 2) for a memory access request (block 606). The WLUT circuit 118 then determines whether a tag portion (such as the tag portion 216 of FIG. 2) of the EA 214 corresponds to a tag of a WLUT entry 210(0) among the plurality of WLUT entries 210(0)-210(S) of the WLUT circuit 118 (block 608). If not, the exemplary operations 600 according to some aspects may continue at block 610 of FIG. 6D.

However, if the WLUT circuit 118 determines that the tag portion 216 of the EA 214 corresponds to a WLUT entry such as the WLUT entry 210(0) of FIG. 2, the WLUT circuit 118 transmits a predicted way indicator (e.g., the predicted way indicator 212(0) of FIG. 2) of the WLUT entry 210(0) to a cache controller (e.g., the cache controller 116 of FIGS. 1 and 2) of the processor-based device 100 (block 612). The cache controller 116 then accesses, in a set among a plurality of sets (e.g., the set 200(0) of the plurality of sets 200(0)-200(S) of FIG. 2) of a cache memory device (such as the cache memory device 114 of FIGS. 1 and 2) corresponding to a set portion (e.g., the set portion 218 of FIG. 2), only a predicted tag way among a plurality of tag ways (such as the tag way 202(0) of the plurality of tag ways 202(0)-202(W) of FIGS. 1 and 2) of the cache memory device 114 indicated by a predicted way indicator (e.g., the predicted way indicator 212(0) of FIG. 2) of the WLUT entry 210(0), and only a predicted data way among a plurality of data ways (e.g., the data way 206(0) of the plurality of data ways 206(0)-206(W)) of the cache memory device 114 indicated by the predicted way indicator 212(0) (block 614). The exemplary operations 600 in some aspects may then continue at block 616 of FIG. 6B.

Figure 6B:
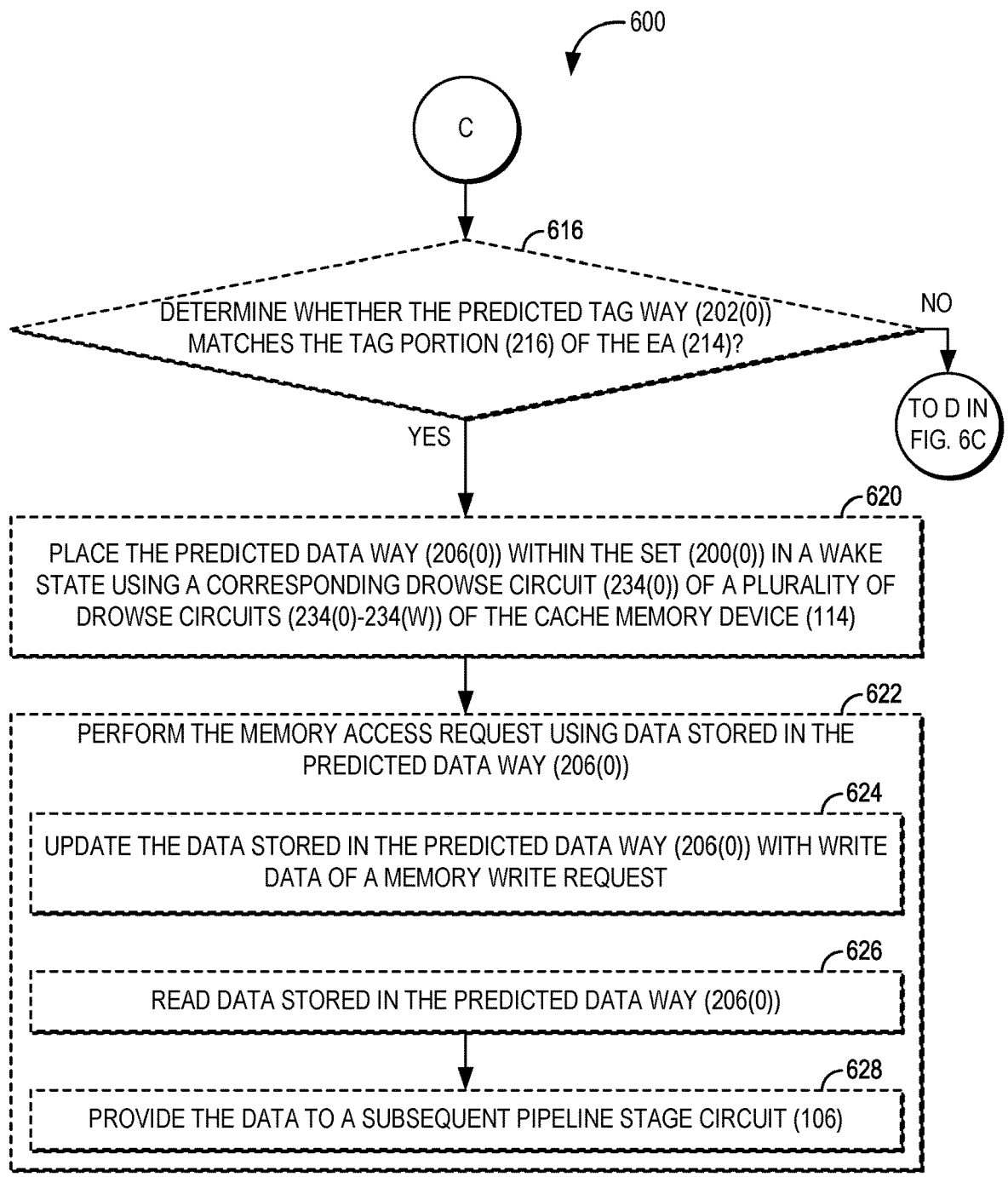

Referring now to FIG. 6B, the exemplary operations 600 in some aspects may continue with the cache controller 116, determining whether the predicted tag way 202(0) matches the tag portion 216 of the EA 214 (block 616). If not, the exemplary operations 600 according to some aspects may continue at block 618 of FIG. 6C. If the cache controller 116 determines at decision block 616 that the predicted tag way 202(0) matches the tag portion 216 of the EA 214, the cache controller 116 in some aspects may place the predicted data way 206(0) within the set 200(0) in a wake state using a corresponding drowse circuit of a plurality of drowse circuits (e.g., the drowse circuits 234(0)-234(W) of FIG. 2) of the cache memory device 114 (block 620). Some aspects may provide that the cache controller 116 performs the memory access request using data stored in the predicted data way 206(0) (block 622). In aspects in which the memory access request comprises a memory write request, the operations of block 622 for performing the memory access request may comprise updating the data stored in the predicted data way 206(0) with write data of the memory write request (block 624). Some aspects in which the memory access request comprises a memory read request may provide that the operations of block 622 for performing the memory access request may comprise the cache controller 116 reading data stored in the predicted data way 206(0) (block 626). The cache controller 116 then provides the data to a subsequent pipeline stage circuit 106(block 628).

Figure 6C:
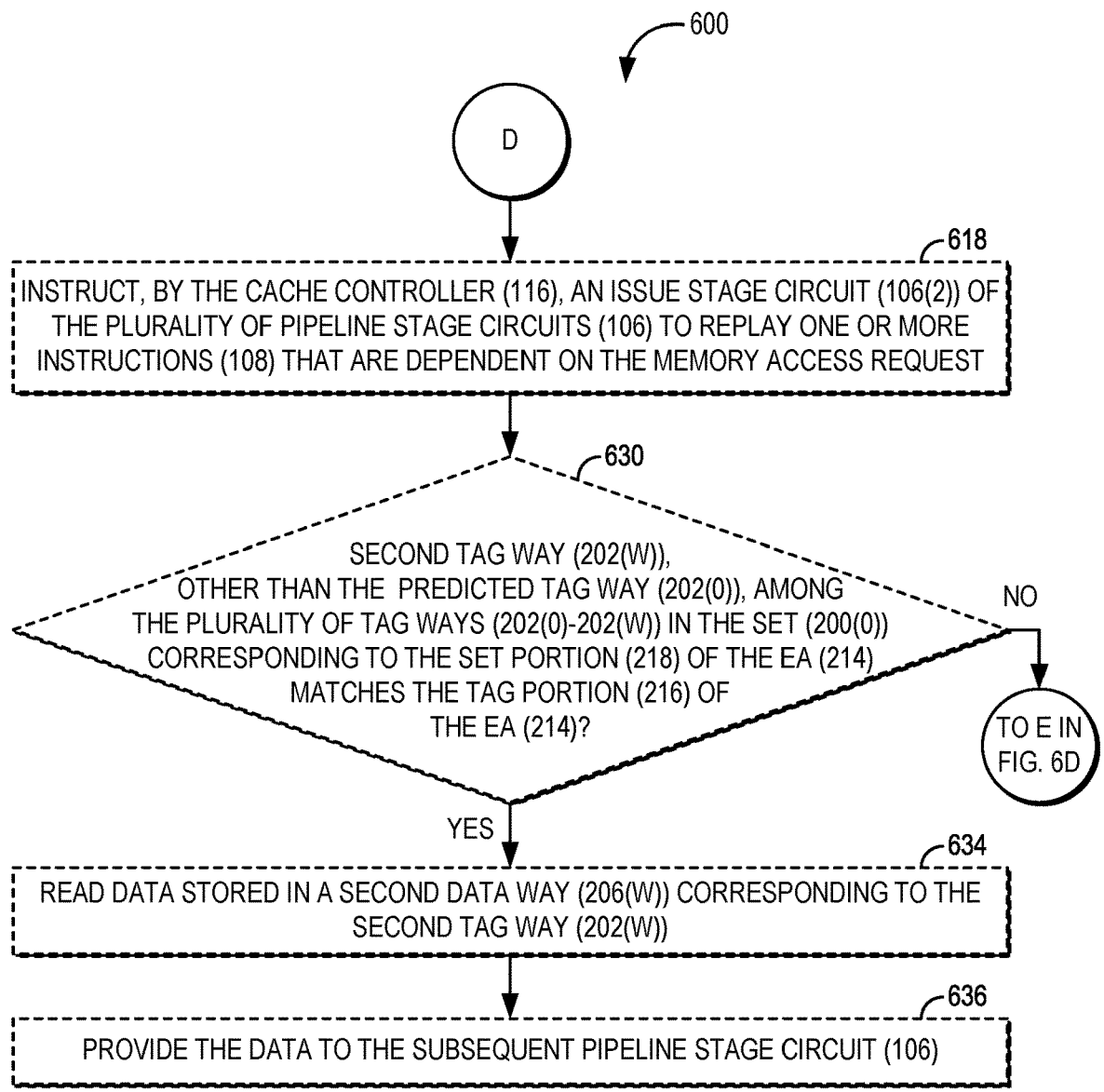

Turning now to FIG. 6C, if the cache controller 116 determines at decision block 616 of FIG. 6B that the predicted tag way 202(0) does not match the tag portion 216 of the EA 214, the cache controller 116 instructs an issue stage circuit (e.g., the issue stage circuit 106(2) of FIG. 1) of the plurality of pipeline stage circuits 106 to replay one or more instructions 108 that are dependent on the memory access request (block 618). The cache controller 116 further determines whether a second tag way (e.g., the tag way 202(W) of FIG. 2), other than the predicted tag way 202(0), among the plurality of tag ways 202(0)-202(W) in the set 200(0) corresponding to the set portion 218 of the EA 214 matches the tag portion 216 of the EA 214 (block 630). If not, the exemplary operations 600 may continue at block 632 of FIG. 6D. However, if the second tag way 202(W) matches the tag portion 216 of the EA 214, the cache controller 116 reads data stored in a second data way (e.g., the data way 206(W) of FIG. 2) corresponding to the second tag way 202(W) (block 634). The cache controller 116 then provides the data to the subsequent pipeline stage circuit 106(block 636).

Figure 6D:
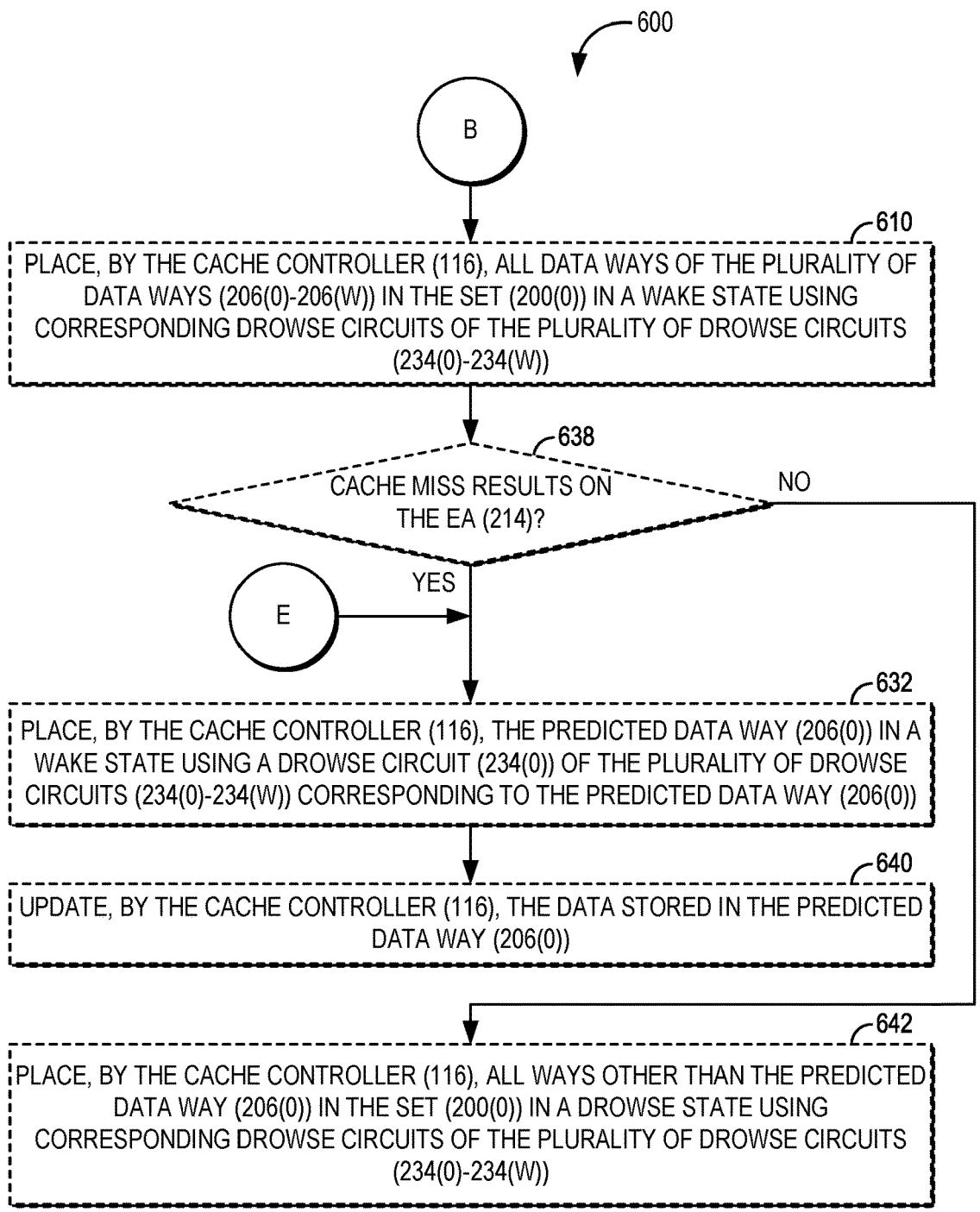

Referring now to FIG. 6D, if the cache controller 116 determines at decision block 608 of FIG. 6A that the tag portion 216 of the EA 214 does not correspond to a tag of a WLUT entry 210(0) among the plurality of WLUT entries 210(0)-210(S) of the WLUT circuit 118, the cache controller 116 in some aspects may place all data ways of the plurality of data ways 206(0)-206(W) in the set 200(0) in a wake state using corresponding drowse circuits of the plurality of drowse circuits 234(0)-234(W) (block 610). The cache controller 116 may further determine whether a cache miss results on the EA 214 (block 638). If so (or if the cache controller 116 determined at decision block 630 of FIG. 6C that no tag way among the plurality of tag ways 202(0)-202(W) in the set 200(0) matches the tag portion 216 of the EA 214), the cache controller 116 places the predicted data way 206(0) in a wake state using a drowse circuit 234(0) of the plurality of drowse circuits 234(0)-234(W) corresponding to the predicted data way 206(0) (block 632). The cache controller 116 also updates the data stored in the predicted data way 206(0) (block 640). If the cache controller 116 determines at decision block 638 that a cache miss does not result on the EA 214, the cache controller 116 places all ways other than the predicted data way 206(0) in the set 200(0) in a drowse state using corresponding drowse circuits of the plurality of drowse circuits 234(0)-234(W) (block 642).

Figure 7A:
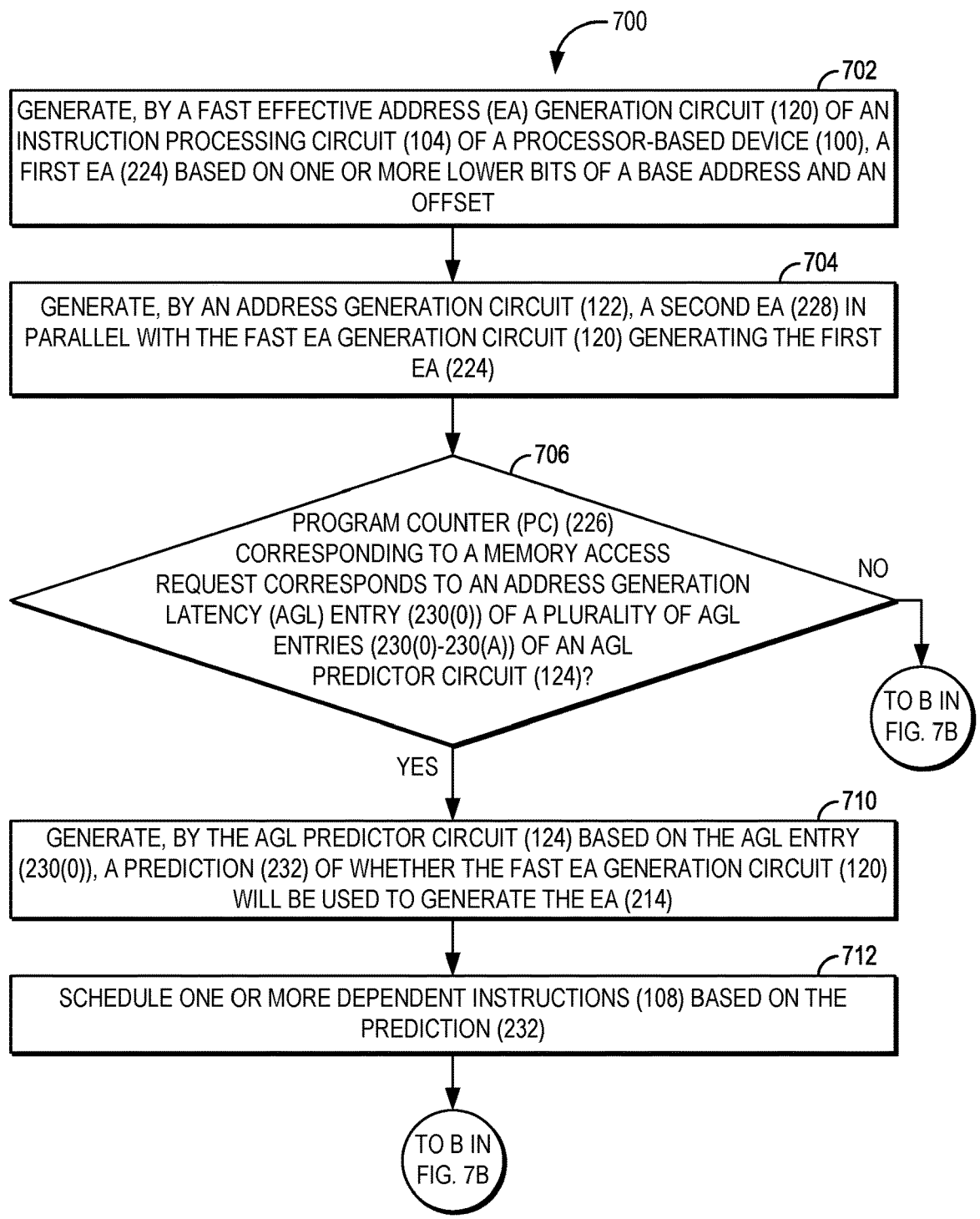
FIGS. 7A-7B provide a flowchart illustrating exemplary operations performed by the AGL predictor circuit, the address generation circuit, and the fast EA generation circuit of FIGS. 1 and 2 for generating an EA for use by the WLUT circuit of FIGS. 1 and 2, according to some aspects.
Figure 7B:
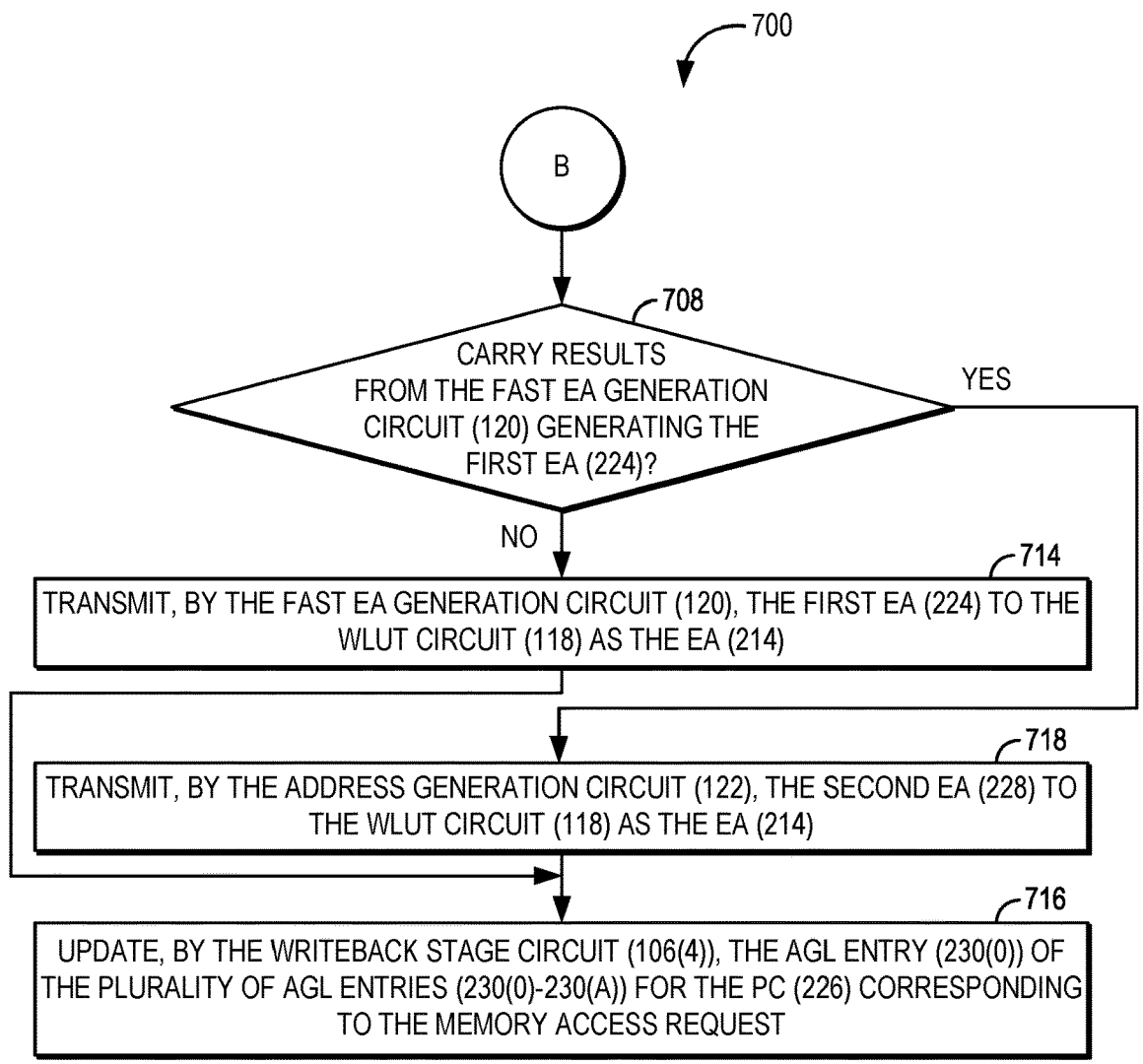

FIGS. 7A-7B provide a flowchart that illustrates exemplary operations 700 performed by the AGL predictor circuit 124, the address generation circuit 122, and the fast EA generation circuit 120 of FIGS. 1 and 2 for generating the EA 214 of FIG. 2 for use by the WLUT circuit 118 of FIGS. 1 and 2, according to some aspects. Elements of FIGS. 1 and 2 are referenced in describing FIGS. 7A-7B for the sake of clarity. It is to be understood that some of the exemplary operations 700 may be performed in an order other than that illustrated herein, and/or may be omitted.

Operations in FIG. 7A begin with a fast EA generation circuit (e.g., the fast EA generation circuit 120 of FIGS. 1 and 2) of an instruction processing circuit (such as the instruction processing circuit 104 of FIG. 1) of a processor-based device (e.g., the processor-based device 100 of FIG. 1) generating a first EA (e.g., the first EA 224 of FIG. 2) based on one or more lower bits of a base address and an offset (block 702). An address generation circuit (such as the address generation circuit 122 of FIGS. 1 and 2) also generates a second EA (e.g., the second EA 228 of FIG. 2) in parallel with the fast EA generation circuit 120 generating the first EA 224 (block 704). An AGL predictor circuit, such as the AGL predictor circuit 124 of FIGS. 1 and 2, next determines whether a PC (such as the PC 226 of FIG. 2) corresponding to a memory access request corresponds to an AGL entry of a plurality of AGL entries of the AGL predictor circuit 124 (e.g., the AGL entry 230(0) of the plurality of AGL entries 230(0)-230(A) of FIG. 2) (block 706). If not, the exemplary operations 700 continue at block 708 of FIG. 7B. However, if it is determined at decision block 706 that the PC 226 corresponds to an AGL entry such as the AGL entry 230(0), the AGL predictor circuit 124 generates, based on the AGL entry 230(0), a prediction (e.g., the prediction 232 of FIG. 2) of whether the fast EA generation circuit 120 will be used to generate the EA 214 (block 710). The AGL predictor circuit 124 then schedules one or more dependent instructions (e.g., one or more of the instructions 108 of FIG. 1) based on the prediction 232 (i.e., based on an expected delay of whichever of the fast EA generation circuit 120 and the address generation circuit 122 is predicted to generate the EA 214) (block 712). The exemplary operations 700 then continue at block 708 of FIG. 7B.

Turning now to FIG. 7B, the exemplary operations 700 continue with the instruction processing circuit 104 determining whether a carry results from the fast EA generation circuit 120 generating the first EA 224 (i.e., indicating whether or not the fast EA generation circuit 120 correctly generated an EA for the PC 226) (block 708). If not (i.e., the first EA 224 is the correct EA for the PC 226), the fast EA generation circuit 120 transmits the first EA 224 to the WLUT circuit 118 as the EA 214 (block 714). The exemplary operations 700 then continue at block 716. However, if it is determined at decision block 708 that a carry did result from the fast EA generation circuit 120 generating the first EA 224 (i.e., the first EA 224 is not the correct EA for the PC 226), the address generation circuit 122 transmits the second EA 228 to the WLUT circuit 118 as the EA 214 (block 718). A writeback stage circuit (e.g., the writeback stage circuit 106(4) of FIG. 1), subsequently updates the AGL entry 230(0) for the PC 226 corresponding to the memory access request (i.e., to indicate whether or not the fast EA generation circuit 120 correctly generated the EA 214 for the PC 226) (block 716).

The processor-based device according to aspects disclosed herein and discussed with reference to FIGS. 1 and 2 may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 8:
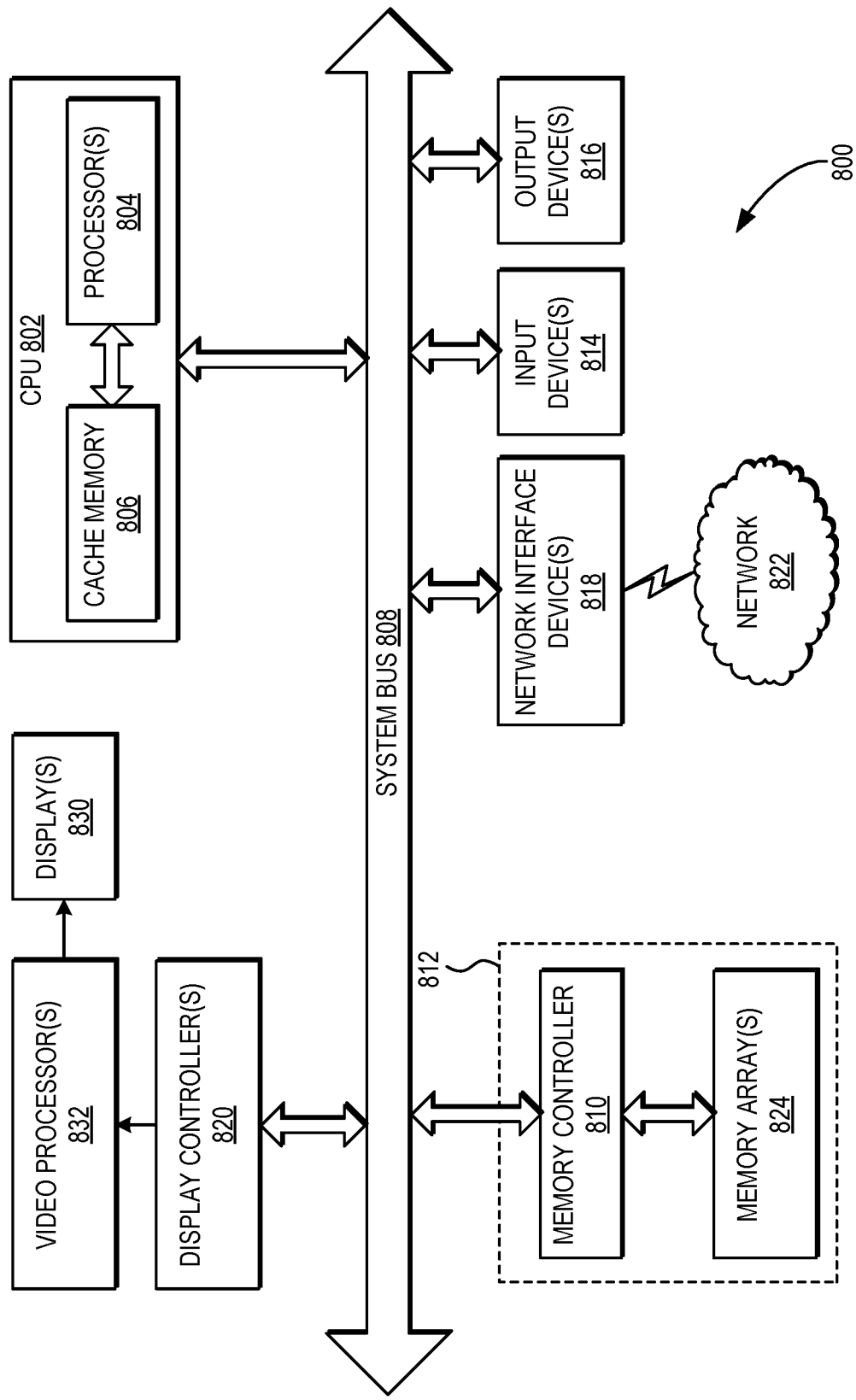
FIG. 8 is a block diagram of an exemplary processor-based device that can include the processor-based device of FIG. 1.

In this regard, FIG. 8 illustrates an example of a processor-based device 800 as illustrated and described with respect to FIGS. 1 and 2. In this example, the processor-based device 800, which corresponds in functionality to the processor-based device 100 of FIG. 1, includes a CPU 802 which comprises one or more processors 804 coupled to a cache memory 806. The processor(s) 804 is also coupled to a system bus 808 and can intercouple devices included in the processor-based device 800. As is well known, the processor(s) 804 communicates with these other devices by exchanging address, control, and data information over the system bus 808. For example, the processor(s) 804 can communicate bus transaction requests to a memory controller 810.

Although not illustrated in FIG. 8, multiple system buses 808 could be provided, wherein each system bus 808 constitutes a different fabric.

Other devices may be connected to the system bus 808. As illustrated in FIG. 8, these devices can include a memory system 812, one or more input devices 814, one or more output devices 816, one or more network interface devices 818, and one or more display controllers 820, as examples. The input device(s) 814 can include any type of input device, including, but not limited to, input keys, switches, voice processors, etc. The output device(s) 816 can include any type of output device, including, but not limited to, audio, video, other visual indicators, etc. The network interface device(s) 818 can be any devices configured to allow exchange of data to and from a network 822. The network 822 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 818 can be configured to support any type of communications protocol desired. The memory system 812 can include the memory controller 810 coupled to one or more memory arrays 824.

The processor(s) 804 may also be configured to access the display controller(s) 820 over the system bus 808 to control information sent to one or more displays 830. The display controller(s) 820 sends information to the display(s) 830 to be displayed via one or more video processors 832, which process the information to be displayed into a format suitable for the display(s) 830. The display(s) 830 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor-based device, comprising:
    a cache controller communicatively coupled to a cache memory device, the cache memory device comprising a tag array and a data array, the cache memory device organized as a plurality of sets each comprising a plurality of tag ways of the tag array and a plurality of data ways of the data array;
    an instruction processing circuit configured to process an instruction stream in an instruction pipeline comprising a plurality of pipeline stage circuits;
    the instruction processing circuit comprising a way lookup table (WLUT) circuit comprising a plurality of WLUT entries that correspond to a plurality of tags and that store a corresponding plurality of predicted way indicators;
    the WLUT circuit is configured to:
        receive an effective address (EA) for a memory access request;
        determine whether a tag portion of the EA corresponds to a tag of a WLUT entry among the plurality of WLUT entries; and
        responsive to determining that the tag portion of the EA corresponds to the tag of the WLUT entry, transmit a predicted way indicator of the WLUT entry to the cache controller; and
    the cache controller is configured to:
        access, in a set among the plurality of sets corresponding to a set portion of the EA, only a predicted tag way among the plurality of tag ways indicated by the predicted way indicator and only a predicted data way among the plurality of data ways indicated by the predicted way indicator.

2. The processor-based device of clause 1, wherein the cache controller is further configured to:
    determine whether the predicted tag way matches the tag portion of the EA; and
    responsive to determining that the predicted tag way matches the tag portion of the EA, perform the memory access request using data stored in the predicted data way.

3. The processor-based device of clause 2, wherein:
    the memory access request is a memory write request; and
    the cache controller is configured to perform the memory access request using the data stored in the predicted data way by being configured to update the data stored in the predicted data way with write data of the memory write request.

4. The processor-based device of clause 2, wherein:
    the memory access request is a memory write request; and
    the cache controller is configured to perform the memory access request using the data stored in the predicted data way by being configured to:
        read the data stored in the predicted data way; and
        provide the data to a subsequent pipeline stage circuit.

5. The processor-based device of clause 2, wherein:
    the memory access request is a memory read request; and
    the cache controller is further configured to, responsive to determining the predicted tag way does not match the tag portion of the EA:
        instruct an issue stage circuit of the plurality of pipeline stage circuits to replay one or more instructions that are dependent on the memory access request;
        determine whether a second tag way, other than the predicted tag way, among the plurality of tag ways in the set corresponding to the set portion of the EA matches the tag portion of the EA; and
        responsive to determining that the second tag way other than the predicted tag way in the set corresponding to the set portion of the EA matches the tag portion of the EA:
            read data stored in a second data way corresponding to the second tag way; and
            provide the data to a subsequent pipeline stage circuit.

6. The processor-based device of any one of clauses 1-5, wherein:

the WLUT circuit is further configured to invalidate one or more WLUT entries of the plurality of WLUT entries responsive to an occurrence of an invalidation condition; and the invalidation condition comprises one or more of a powerup of the processor-based device, a virtual address (VA) to physical address (PA) mapping change, a change of a way corresponding to a tag, and an eviction of a cache line.

7. The processor-based device of any one of clauses 1-6, wherein:
a count of the plurality of WLUT entries corresponds to a count of the plurality of sets; and
each predicted way indicator of the plurality of predicted way indicators comprises a number N+1 of bits, wherein N is a base two (2) logarithm of a count of the plurality of data ways.

8. The processor-based device of any one of clauses 1-7, wherein:
the instruction processing circuit further comprises a fast EA generation circuit that comprises an adder circuit that has a size smaller than an architecturally-defined base address; and
the fast EA generation circuit is configured to:
generate a first EA based on one or more lower bits of a base address and an offset;
determine whether a carry results from generating the first EA; and
responsive to determining that a carry does not result from generating the first EA, transmit the first EA to the WLUT circuit as the EA.

9. The processor-based device of clause 8, wherein:
the instruction processing circuit further comprises an address generation circuit; and
the address generation circuit is configured to:
generate a second EA in parallel with the fast EA generation circuit generating the first EA; and
responsive to the fast EA generation circuit determining that a carry results from generating the first EA, transmit the second EA to the WLUT circuit as the EA.

10. The processor-based device of clause 9, wherein:
the instruction processing circuit further comprises an address generation latency (AGL) predictor circuit comprising a plurality of AGL entries; and
the AGL predictor circuit configured to:
determine, during an issue stage circuit of the plurality of pipeline stage circuits, whether a program counter (PC) corresponding to the memory access request corresponds to an AGL entry of the plurality of AGL entries;
responsive to determining that the PC corresponding to the memory access request corresponds to the AGL entry of the plurality of AGL entries, generate, based on the AGL entry, a prediction of whether the fast EA generation circuit will be used to generate the EA; and
schedule one or more dependent instructions based on the prediction.

11. The processor-based device of clause 10, wherein the instruction processing circuit is further configured to update, using a writeback stage circuit of the plurality of pipeline stage circuits, the AGL entry of the plurality of AGL entries for the PC corresponding to the memory access request.

12. The processor-based device of any one of clauses 1-11, wherein:
the cache memory device comprises a plurality of drowse circuits corresponding to the plurality of data ways; and
the cache controller is configured to:
place all of the plurality of data ways in a drowse state on powerup of the processor-based device using the plurality of drowse circuits; and
further responsive to determining that the predicted tag way matches the tag portion of the EA, place the predicted data way in a wake state using a drowse circuit of the plurality of drowse circuits corresponding to the predicted data way.

13. The processor-based device of clause 12, wherein:
the memory access request is a memory read request; and
the cache controller is further configured to:
determine whether a cache miss results on the EA;
responsive to determining that a cache miss results on the EA:
place the predicted data way in a wake state using a drowse circuit of the plurality of drowse circuits corresponding to the predicted data way; and
update the data stored in the predicted data way; and
responsive to determining that a cache miss does not result on the EA:
place all ways other than the predicted data way in the set in a drowse state using corresponding drowse circuits of the plurality of drowse circuits.

14. The processor-based device of any one of clauses 12-13, wherein the cache controller is further configured to, responsive to the WLUT circuit determining that the tag portion of the EA does not corresponds to the tag of a WLUT entry among the plurality of WLUT entries, place all data ways of the plurality of data ways in the set in a wake state using corresponding drowse circuits of the plurality of drowse circuits.

15. The processor-based device of any one of clauses 1-14, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

16. A processor-based device, comprising:
means for receiving an effective address (EA) for a memory access request;
means for determining that a tag portion of the EA corresponds to a tag of a way lookup table (WLUT) entry among a plurality of WLUT entries of a WLUT circuit; and
means for accessing, in a set among a plurality of sets of a cache memory device corresponding to a set portion of the EA, only a predicted tag way among a plurality of tag ways of the cache memory device indicated by a predicted way indicator of the WLUT entry and only a predicted data way among a plurality of data ways of the cache memory device indicated by the predicted way indicator of the WLUT entry.

17. A method for optimizing cache energy consumption, comprising:
receiving, by a way lookup table (WLUT) circuit of an instruction processing circuit of a processor-based device, an effective address (EA) for a memory access request;
determining, by the WLUT circuit, that a tag portion of the EA corresponds to a tag of a WLUT entry among a plurality of WLUT entries of the WLUT circuit;
responsive to determining that the tag portion of the EA corresponds to the tag of the WLUT entry, transmitting, by the WLUT circuit, a predicted way indicator of the WLUT entry to a cache controller of the processor-based device; and
accessing, by the cache controller in a set among a plurality of sets of a cache memory device corresponding to a set portion of the EA, only a predicted tag way among a plurality of tag ways of the cache memory device indicated by the predicted way indicator and only a predicted data way among a plurality of data ways of the cache memory device indicated by the predicted way indicator.

18. The method of clause 17, further comprising:
determining, by the cache controller, that the predicted tag way matches the tag portion of the EA; and
responsive to determining that the predicted tag way matches the tag portion of the EA, performing the memory access request using data stored in the predicted data way.

19. The method of clause 18, wherein:
the memory access request is a memory write request; and
performing the memory access request using the data stored in the predicted data way comprises updating, by the cache controller, the data stored in the predicted data way with write data of the memory write request.

20. The method of clause 18, wherein:
the memory access request is a memory write request; and
performing the memory access request using the data stored in the predicted data way comprises:
reading the data stored in the predicted data way; and
providing the data to a subsequent pipeline stage circuit.

21. The method of clause 17, wherein:
the memory access request is a memory read request; and
the method further comprises:
determining, by the cache controller, that the predicted tag way does not match the tag portion of the EA; and
responsive to determining that the predicted tag way does not match the tag portion of the EA:
instruct an issue stage circuit of a plurality of pipeline stage circuits to replay one or more instructions that are dependent on the memory access request;
determine that a second tag way, other than the predicted tag way, among the plurality of tag ways in the set corresponding to the set portion of the EA matches the tag portion of the EA; and
responsive to determining a second tag way, other than the predicted tag way, among the plurality of tag ways in the set corresponding to the set portion of the EA matches the tag portion of the EA:
read data stored in a second data way corresponding to the second tag way; and
provide the data to a subsequent pipeline stage circuit.

22. The method of any one of clauses 17-21, further comprising invalidating, by the WLUT circuit, one or more WLUT entries of the plurality of WLUT entries responsive to an occurrence of an invalidation condition;
wherein the invalidation condition comprises one or more of a powerup of the processor-based device, a virtual address (VA) to physical address (PA) mapping change, a change of a way corresponding to a tag, and an eviction of a cache line.

23. The method of any one of clauses 17-22, wherein:
a count of the plurality of WLUT entries corresponds to a count of the plurality of sets; and
each predicted way indicator of a plurality of predicted way indicators comprises a number N+1 of bits, wherein N is a base two (2) logarithm of a count of the plurality of data ways.

24. The method of any one of clauses 17-23, wherein:
the instruction processing circuit further comprises a fast EA generation circuit that comprises an adder circuit that has a size smaller than an architecturally-defined base address; and
the method further comprises:
generating, by the fast EA generation circuit, a first EA based on one or more lower bits of a base address and an offset;
determining, by the fast EA generation circuit, that a carry does not result from generating the first EA; and
responsive to determining that a carry does not result from generating the first EA, transmitting, by the fast EA generation circuit, the first EA to the WLUT circuit as the EA.

25. The method of any one of clauses 17-23, wherein:
the instruction processing circuit further comprises:
a fast EA generation circuit that comprises an adder circuit that has a size smaller than an architecturally-defined base address; and
an address generation circuit; and
the method further comprises:
generating, by the fast EA generation circuit, a first EA based on one or more lower bits of a base address and an offset;
generating, by the address generation circuit, a second EA in parallel with the fast EA generation circuit generating the first EA;
determining, by the fast EA generation circuit, that a carry results from generating the first EA; and
responsive to the fast EA generation circuit determining that a carry results from generating the first EA, transmitting, by the address generation circuit, the second EA to the WLUT circuit as the EA.

26. The method of clause 25, wherein:
the instruction processing circuit further comprises:

an address generation latency (AGL) predictor circuit comprising a plurality of AGL entries; and
the method further comprises:
 determining, by the AGL predictor circuit during an issue stage circuit of a plurality of pipeline stage circuits, that a program counter (PC) corresponding to the memory access request corresponds to an AGL entry of the plurality of AGL entries; and
 responsive to determining that the PC corresponding to the memory access request corresponds to the AGL entry of the plurality of AGL entries, generating, by the AGL predictor circuit based on the AGL entry, a prediction of whether the fast EA generation circuit will be used to generate the EA; and
 scheduling one or more dependent instructions based on the prediction.

27. The method of clause 26, further comprising updating, by the instruction processing circuit using a writeback stage circuit, the AGL entry of the plurality of AGL entries for the PC corresponding to the memory access request.

28. The method of any one of clauses 18-27, further comprising:
 placing, by the cache controller, all of the plurality of data ways in a drowse state on powerup of the processor-based device using a corresponding plurality of drowse circuits of the cache memory device; and
 further responsive to determining that the predicted tag way matches the tag portion of the EA, placing, by the cache controller, the predicted data way in a wake state using a drowse circuit of the plurality of drowse circuits corresponding to the predicted data way.

29. The method of clause 28, wherein:
 the memory access request is a memory read request; and
 the method further comprises:
  determining, by the cache controller, that a cache miss results on the EA; and
  responsive to determining that the cache miss results on the EA:
   placing, by the cache controller, the predicted data way in a wake state using a drowse circuit of the plurality of drowse circuits corresponding to the predicted data way; and
   updating the data stored in the predicted data way.

30. The method of any one of clauses 28-29, further comprising:
 receiving, by the WLUT circuit, a second EA for a second memory access request;
 determining, by the WLUT circuit, that a tag portion of the second EA does not correspond to a tag of a WLUT entry among the plurality of WLUT entries of the WLUT circuit; and
 responsive to the WLUT circuit determining that the tag portion of the second EA does not correspond to the tag of a WLUT entry among the plurality of WLUT entries, placing, by the cache controller, all data ways of the plurality of data ways in the set in a wake state using corresponding drowse circuits of the plurality of drowse circuits.

31. A non-transitory computer-readable medium, having stored thereon computer-executable instructions that, when executed, cause a processor of a processor-based device to:
 receive an effective address (EA) for a memory access request;
 determine that a tag portion of the EA corresponds to a tag of a way lookup table (WLUT) entry among a plurality of WLUT entries of a WLUT circuit; and
 access, in a set among a plurality of sets of a cache memory device corresponding to a set portion of the EA, only a predicted tag way among a plurality of tag ways of the cache memory device indicated by a predicted way indicator of the WLUT entry and only a predicted data way among a plurality of data ways of the cache memory device indicated by the predicted way indicator.

What is claimed is:

1. A processor-based device, comprising:
 a cache controller communicatively coupled to a cache memory device, the cache memory device comprising a tag array and a data array, the cache memory device organized as a plurality of sets each comprising a plurality of tag ways of the tag array and a plurality of data ways of the data array;
 an instruction processing circuit configured to process an instruction stream in an instruction pipeline comprising a plurality of pipeline stage circuits;
 the instruction processing circuit comprising a way lookup table (WLUT) circuit comprising a plurality of WLUT entries that correspond to a plurality of tags and that store a corresponding plurality of predicted way indicators, wherein:
  a count of the plurality of WLUT entries corresponds to a count of the plurality of sets; and
  each predicted way indicator of the plurality of predicted way indicators comprises a number N of bits, wherein N is a base two (2) logarithm of a count of the plurality of data ways;
 the WLUT circuit is configured to:
  receive an effective address (EA) for a memory access request;
  determine whether a tag portion of the EA corresponds to a tag of a WLUT entry among the plurality of WLUT entries; and
  responsive to determining that the tag portion of the EA corresponds to the tag of the WLUT entry, transmit a predicted way indicator of the WLUT entry to the cache controller, wherein the predicted way indicator comprises an identifier of a predicted tag way among the plurality of tag ways and a corresponding predicted data way among the plurality of data ways; and
 the cache controller is configured to:
  access, in a set among the plurality of sets corresponding to a set portion of the EA, only the predicted tag way among the plurality of tag ways indicated by the predicted way indicator and only the predicted data way among the plurality of data ways indicated by the predicted way indicator.

2. The processor-based device of claim 1, wherein the cache controller is further configured to:
 determine whether the predicted tag way matches the tag portion of the EA; and
 responsive to determining that the predicted tag way matches the tag portion of the EA, perform the memory access request using data stored in the predicted data way.

3. The processor-based device of claim 2, wherein:
the memory access request is a memory write request; and the cache controller is configured to perform the memory access request using the data stored in the predicted data way by being configured to update the data stored in the predicted data way with write data of the memory write request.

4. The processor-based device of claim 2, wherein:
the memory access request is a memory read request; and
the cache controller is configured to perform the memory access request using the data stored in the predicted data way by being configured to:
  read the data stored in the predicted data way; and
  provide the data to a subsequent pipeline stage circuit.

5. The processor-based device of claim 2, wherein:
the memory access request is a memory read request; and
the cache controller is further configured to, responsive to determining the predicted tag way does not match the tag portion of the EA:
  instruct an issue stage circuit of the plurality of pipeline stage circuits to replay one or more instructions that are dependent on the memory access request;
  determine whether a second tag way, other than the predicted tag way, among the plurality of tag ways in the set corresponding to the set portion of the EA matches the tag portion of the EA; and
  responsive to determining that the second tag way other than the predicted tag way in the set corresponding to the set portion of the EA matches the tag portion of the EA:
    read data stored in a second data way corresponding to the second tag way; and
    provide the data to a subsequent pipeline stage circuit.

6. The processor-based device of claim 1, wherein:
the WLUT circuit is further configured to invalidate one or more WLUT entries of the plurality of WLUT entries responsive to an occurrence of an invalidation condition; and
the invalidation condition comprises one or more of a powerup of the processor-based device, a virtual address (VA) to physical address (PA) mapping change, a change of a way corresponding to a tag, and an eviction of a cache line.

7. The processor-based device of claim 1, wherein:
the instruction processing circuit further comprises a fast EA generation circuit that comprises an adder circuit that has a size smaller than an architecturally-defined base address; and
the fast EA generation circuit is configured to:
  generate a first EA based on one or more lower bits of a base address and an offset;
  determine whether a carry results from generating the first EA; and
  responsive to determining that a carry does not result from generating the first EA, transmit the first EA to the WLUT circuit as the EA.

8. The processor-based device of claim 7, wherein:
the instruction processing circuit further comprises an address generation circuit; and
the address generation circuit is configured to:
  generate a second EA in parallel with the fast EA generation circuit generating the first EA; and
  responsive to the fast EA generation circuit determining that a carry results from generating the first EA, transmit the second EA to the WLUT circuit as the EA.

9. The processor-based device of claim 8, wherein:
the instruction processing circuit further comprises an address generation latency (AGL) predictor circuit comprising a plurality of AGL entries; and
the AGL predictor circuit configured to:
  determine, during an issue stage circuit of the plurality of pipeline stage circuits, whether a program counter (PC) corresponding to the memory access request corresponds to an AGL entry of the plurality of AGL entries;
  responsive to determining that the PC corresponding to the memory access request corresponds to the AGL entry of the plurality of AGL entries, generate, based on the AGL entry, a prediction of whether the fast EA generation circuit will be used to generate the EA; and
  schedule one or more dependent instructions based on the prediction.

10. The processor-based device of claim 9, wherein the instruction processing circuit is further configured to update, using a writeback stage circuit of the plurality of pipeline stage circuits, the AGL entry of the plurality of AGL entries for the PC corresponding to the memory access request.

11. The processor-based device of claim 2, wherein:
the cache memory device comprises a plurality of drowse circuits corresponding to the plurality of data ways; and
the cache controller is configured to:
  place all of the plurality of data ways in a drowse state on powerup of the processor-based device using the plurality of drowse circuits; and
  further responsive to determining that the predicted tag way matches the tag portion of the EA, place the predicted data way in a wake state using a drowse circuit of the plurality of drowse circuits corresponding to the predicted data way.

12. The processor-based device of claim 11, wherein:
the memory access request is a memory read request; and
the cache controller is further configured to:
  determine whether a cache miss results on the EA;
  responsive to determining that a cache miss results on the EA:
    place the predicted data way in a wake state using a drowse circuit of the plurality of drowse circuits corresponding to the predicted data way; and
    update the data stored in the predicted data way; and
  responsive to determining that a cache miss does not result on the EA:
    place all ways other than the predicted data way in the set in a drowse state using corresponding drowse circuits of the plurality of drowse circuits.

13. The processor-based device of claim 11, wherein the cache controller is further configured to, responsive to the WLUT circuit determining that the tag portion of the EA does not corresponds to the tag of a WLUT entry among the plurality of WLUT entries, place all data ways of the plurality of data ways in the set in a wake state using corresponding drowse circuits of the plurality of drowse circuits.

14. The processor-based device of claim 1, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer;

a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

15. A processor-based device, comprising:
means for receiving an effective address (EA) for a memory access request;
means for determining that a tag portion of the EA corresponds to a tag of a way lookup table (WLUT) entry among a plurality of WLUT entries of a WLUT circuit; and
means for accessing, in a set among a plurality of sets of a cache memory device corresponding to a set portion of the EA, only a predicted tag way among a plurality of tag ways of the cache memory device indicated by a predicted way indicator of the WLUT entry and only a predicted data way among a plurality of data ways of the cache memory device indicated by the predicted way indicator of the WLUT entry, wherein the predicted way indicator comprises an identifier of the predicted tag way among the plurality of tag ways and the corresponding predicted data way among the plurality of data ways;
wherein:
a count of the plurality of WLUT entries corresponds to a count of the plurality of sets; and
the predicted way indicator comprises a number N of bits, wherein N is a base two (2) logarithm of a count of the plurality of data ways.

16. A method for optimizing cache energy consumption, comprising:
receiving, by a way lookup table (WLUT) circuit of an instruction processing circuit of a processor-based device, an effective address (EA) for a memory access request;
determining, by the WLUT circuit, that a tag portion of the EA corresponds to a tag of a WLUT entry among a plurality of WLUT entries of the WLUT circuit;
responsive to determining that the tag portion of the EA corresponds to the tag of the WLUT entry, transmitting, by the WLUT circuit, a predicted way indicator of the WLUT entry to a cache controller of the processor-based device, wherein the predicted way indicator comprises an identifier of a predicted tag way among a plurality of tag ways of a cache memory device and a corresponding predicted data way among a plurality of data ways of the cache memory device; and
accessing, by the cache controller in a set among a plurality of sets of the cache memory device corresponding to a set portion of the EA, only the predicted tag way among the plurality of tag ways of the cache memory device indicated by the predicted way indicator and only the predicted data way among the plurality of data ways of the cache memory device indicated by the predicted way indicator;
wherein:
a count of the plurality of WLUT entries corresponds to a count of the plurality of sets; and
the predicted way indicator comprises a number N of bits, wherein N is a base two (2) logarithm of a count of the plurality of data ways.

17. The method of claim 16, further comprising:
determining, by the cache controller, that the predicted tag way matches the tag portion of the EA; and
responsive to determining that the predicted tag way matches the tag portion of the EA, performing the memory access request using data stored in the predicted data way.

18. The method of claim 17, wherein:
the memory access request is a memory write request; and
performing the memory access request using the data stored in the predicted data way comprises updating, by the cache controller, the data stored in the predicted data way with write data of the memory write request.

19. The method of claim 17, wherein:
the memory access request is a memory read request; and
performing the memory access request using the data stored in the predicted data way comprises:
reading the data stored in the predicted data way; and
providing the data to a subsequent pipeline stage circuit.

20. The method of claim 16, wherein:
the memory access request is a memory read request; and
the method further comprises:
determining, by the cache controller, that the predicted tag way does not match the tag portion of the EA; and
responsive to determining that the predicted tag way does not match the tag portion of the EA:
instruct an issue stage circuit of a plurality of pipeline stage circuits to replay one or more instructions that are dependent on the memory access request;
determine that a second tag way, other than the predicted tag way, among the plurality of tag ways in the set corresponding to the set portion of the EA matches the tag portion of the EA; and
responsive to determining a second tag way, other than the predicted tag way, among the plurality of tag ways in the set corresponding to the set portion of the EA matches the tag portion of the EA:
read data stored in a second data way corresponding to the second tag way; and
provide the data to a subsequent pipeline stage circuit.

21. The method of claim 16, further comprising invalidating, by the WLUT circuit, one or more WLUT entries of the plurality of WLUT entries responsive to an occurrence of an invalidation condition;
wherein the invalidation condition comprises one or more of a powerup of the processor-based device, a virtual address (VA) to physical address (PA) mapping change, a change of a way corresponding to a tag, and an eviction of a cache line.

22. The method of claim 16, wherein:
the instruction processing circuit further comprises a fast EA generation circuit that comprises an adder circuit that has a size smaller than an architecturally-defined base address; and
the method further comprises:
generating, by the fast EA generation circuit, a first EA based on one or more lower bits of a base address and an offset;
determining, by the fast EA generation circuit, that a carry does not result from generating the first EA; and
responsive to determining that a carry does not result from generating the first EA, transmitting, by the fast EA generation circuit, the first EA to the WLUT circuit as the EA.

23. The method of claim 16, wherein:
the instruction processing circuit further comprises:
   a fast EA generation circuit that comprises an adder circuit that has a size smaller than an architecturally-defined base address; and
   an address generation circuit; and
the method further comprises:
   generating, by the fast EA generation circuit, a first EA based on one or more lower bits of a base address and an offset;
   generating, by the address generation circuit, a second EA in parallel with the fast EA generation circuit generating the first EA;
   determining, by the fast EA generation circuit, that a carry results from generating the first EA; and
   responsive to the fast EA generation circuit determining that a carry results from generating the first EA, transmitting, by the address generation circuit, the second EA to the WLUT circuit as the EA.

24. The method of claim 23, wherein:
the instruction processing circuit further comprises:
   an address generation latency (AGL) predictor circuit comprising a plurality of AGL entries; and
the method further comprises:
   determining, by the AGL predictor circuit during an issue stage circuit of a plurality of pipeline stage circuits, that a program counter (PC) corresponding to the memory access request corresponds to an AGL entry of the plurality of AGL entries; and
   responsive to determining that the PC corresponding to the memory access request corresponds to the AGL entry of the plurality of AGL entries, generating, by the AGL predictor circuit based on the AGL entry, a prediction of whether the fast EA generation circuit will be used to generate the EA; and
   scheduling one or more dependent instructions based on the prediction.

25. The method of claim 24, further comprising updating, by the instruction processing circuit using a writeback stage circuit, the AGL entry of the plurality of AGL entries for the PC corresponding to the memory access request.

26. The method of claim 17, further comprising:
placing, by the cache controller, all of the plurality of data ways in a drowse state on powerup of the processor-based device using a corresponding plurality of drowse circuits of the cache memory device; and
further responsive to determining that the predicted tag way matches the tag portion of the EA, placing, by the cache controller, the predicted data way in a wake state using a drowse circuit of the plurality of drowse circuits corresponding to the predicted data way.

27. The method of claim 26, wherein:
the memory access request is a memory read request; and
the method further comprises:
   determining, by the cache controller, that a cache miss results on the EA; and
   responsive to determining that the cache miss results on the EA:
     placing, by the cache controller, the predicted data way in a wake state using a drowse circuit of the plurality of drowse circuits corresponding to the predicted data way; and
     updating the data stored in the predicted data way.

28. The method of claim 26, further comprising:
receiving, by the WLUT circuit, a second EA for a second memory access request;
determining, by the WLUT circuit, that a tag portion of the second EA does not correspond to a tag of a WLUT entry among the plurality of WLUT entries of the WLUT circuit; and
responsive to the WLUT circuit determining that the tag portion of the second EA does not correspond to the tag of a WLUT entry among the plurality of WLUT entries, placing, by the cache controller, all data ways of the plurality of data ways in the set in a wake state using corresponding drowse circuits of the plurality of drowse circuits.

29. A non-transitory computer-readable medium, having stored thereon computer-executable instructions that, when executed, cause a processor of a processor-based device to:
receive an effective address (EA) for a memory access request;
determine that a tag portion of the EA corresponds to a tag of a way lookup table (WLUT) entry among a plurality of WLUT entries of a WLUT circuit; and
access, in a set among a plurality of sets of a cache memory device corresponding to a set portion of the EA, only a predicted tag way among a plurality of tag ways of the cache memory device indicated by a predicted way indicator of the WLUT entry and only a predicted data way among a plurality of data ways of the cache memory device indicated by the predicted way indicator, wherein the predicted way indicator comprises an identifier of the predicted tag way among the plurality of tag ways and the corresponding predicted data way among the plurality of data ways;
wherein:
   a count of the plurality of WLUT entries corresponds to a count of the plurality of sets; and
   the predicted way indicator comprises a number N of bits, wherein N is a base two (2) logarithm of a count of the plurality of data ways.

* * * * *